US009953107B2

United States Patent
Marukame et al.

(10) Patent No.: US 9,953,107 B2
(45) Date of Patent: Apr. 24, 2018

(54) MEMORY SYSTEM INCLUDING KEY-VALUE STORE

(71) Applicant: Toshiba Memory Corporation, Tokyo (JP)

(72) Inventors: Takao Marukame, Tokyo (JP); Atsuhiro Kinoshita, Kamakura (JP); Kosuke Tatsumura, Kawasaki (JP)

(73) Assignee: Toshiba Memory Corporation, Tokyo (JP)

( * ) Notice: Subject to any disclaimer, the term of this patent is extended or adjusted under 35 U.S.C. 154(b) by 183 days.

(21) Appl. No.: 14/527,373

(22) Filed: Oct. 29, 2014

(65) Prior Publication Data

US 2015/0074341 A1 Mar. 12, 2015

Related U.S. Application Data

(63) Continuation of application No. 13/569,605, filed on Aug. 8, 2012, now Pat. No. 9,361,408.

(30) Foreign Application Priority Data

Aug. 8, 2011 (JP) .................................. 2011-172759

(51) Int. Cl.
*G06F 17/30* (2006.01)
*G06F 12/02* (2006.01)

(52) U.S. Cl.
CPC .... *G06F 17/30982* (2013.01); *G06F 12/0246* (2013.01); *G06F 17/3012* (2013.01); *G06F 17/30097* (2013.01); *G06F 2212/7201* (2013.01)

(58) Field of Classification Search
None
See application file for complete search history.

(56) References Cited

U.S. PATENT DOCUMENTS

| 5,659,755 A | 8/1997 | Strohacker |
| 5,715,419 A | 2/1998 | Szczepanek et al. |

(Continued)

FOREIGN PATENT DOCUMENTS

| CN | 102591970 | 7/2012 |
| JP | H09-223972 | 8/1997 |

(Continued)

OTHER PUBLICATIONS

Rao, Rajesh. "Hashing". University of Washington. Spring 2001. <https://courses.cs.washington.edu/courses/cse373/01sp/Lect13.pdf>.*

(Continued)

*Primary Examiner* — Charles Rones
*Assistant Examiner* — Hewy H Li
(74) *Attorney, Agent, or Firm* — Finnegan, Henderson, Farabow, Garrett & Dunner, L.L.P.

(57) ABSTRACT

According to one embodiment, a memory system including a key-value store containing key-value data as a pair of a key and a value corresponding to the key, includes an interface, a memory block, an address acquisition circuit and a controller. The interface receives a data write/read request or a request based on the key-value store. The memory block has a data area for storing data and a metadata table containing the key-value data. The address acquisition circuit acquires an address in response to input of the key. The controller executes the data write/read request for the memory block, and outputs the address acquired to the memory block and executes the request based on the key-value store. The controller outputs the value corresponding to the key via the interface.

23 Claims, 18 Drawing Sheets

(56) References Cited

U.S. PATENT DOCUMENTS

| | | | |
|---|---|---|---|
| 6,684,314 | B1 | 1/2004 | Manter |
| 7,739,312 | B2 * | 6/2010 | Gordon .................. G06F 3/0608 707/802 |
| 2003/0229753 | A1 | 12/2003 | Hwang |
| 2004/0215920 | A1 | 10/2004 | Haas et al. |
| 2008/0189485 | A1 * | 8/2008 | Jung .................... G06F 12/0246 711/115 |
| 2010/0058178 | A1 | 3/2010 | Dong et al. |
| 2010/0217948 | A1 * | 8/2010 | Mason .................. G06F 12/0866 711/171 |
| 2012/0036317 | A1 | 2/2012 | Torii |
| 2013/0036277 | A1 | 2/2013 | Szczepkowski et al. |
| 2013/0042060 | A1 | 2/2013 | Marukame et al. |

FOREIGN PATENT DOCUMENTS

| | | |
|---|---|---|
| JP | 2004-013895 A | 1/2004 |
| JP | 2004-192426 A | 7/2004 |
| JP | 2004-326772 A | 11/2004 |
| JP | 2005-209214 | 8/2005 |
| JP | 2007-128439 A | 5/2007 |
| JP | 4167359 | 8/2008 |
| JP | 2009-20757 | 1/2009 |
| JP | 2010-506247 | 2/2010 |
| JP | 5524144 B2 | 6/2014 |
| JP | 5646775 B2 | 12/2014 |
| JP | 5833212 B2 | 12/2015 |
| WO | WO 2010/114006 A1 | 7/2010 |
| WO | WO 2010/114006 | 10/2010 |
| WO | WO 2010/151750 | 12/2010 |

OTHER PUBLICATIONS

Altavilla, Dave. "Fusion-io ioXtreme PCI Express SSD Review". Hot Hardware. Published Nov. 16, 2009. <http://hothardware.com/Reviews/Fusionio-ioXtreme-PCI-Express-SSD-Review/?page=1>.*

Various Authors. "What's up with O(1)?". Stack Overflow. <https://stackoverflow.com/questions/332952/whats-up-with-o1>. Published Dec. 2008. Retrieved Jun. 5, 2017.*

McQuain. "Hash Functions and Hash Tables". <http://courses.cs.vt.edu/~cs3114/Fall10/Notes/T16.HashFunctions.pdf>. Published Fall 2010.*

First Office Action issued by the Japanese Patent Office in Japanese Application No. 2014-221667, dated Jul. 21, 2015.

First Office Action, in corresponding Japanese Patent Application 2011-172759, dated Jan. 21, 2014, and English translation thereof. 5 pgs.

Martinez, Tony. "Smart Memory Architecture and Methods." Future Generation Computing Systems. vol. 6. No. 1. p. 26-58, 1990.

Szczepkowski, Jerry. "Solid State Deduplication Index." U.S. Appl. No. 61/381,161, filed Sep. 9, 2010.

Satyamoorthy, Prateeksha. "STT-RAM for Shared Memory in GPUs." Published May 2011.

Bandyopadhyay, Shamik. "A Scratchpad Memory Allocation Scheme for Dataflow Models." p. 1-10. Published Aug. 25, 2008.

Schmid, Patrick. "Three PCI Express-Based SSDs: When SATA 6 GB/s Is Too Slow." Published Jun. 30, 2011.

"Direct Memory Access (DMA)." Published Feb. 1, 2002.

Gokhale, Salil, et al. "KVZone and the search for a write-optimized key-value store." Proceedings of the $2^{nd}$ USENIX conference on Hot topics in storage and file systems. USENIX Association, 2010.

Kinoshita et al. "Memory System Including Key-Value Store." Filed Aug. 8, 2012. U.S. Appl. No. 13/569,542.

Marukame et al. "Semiconductor Memory Device, Information Processing System and Control Method." Filed Feb. 8, 2013. U.S. Appl. No. 13/762,986.

Notice for Filing Opinion Issued by Korean Intellectual Property Office in Korean Application No. 10-2012-86438 dated Aug. 28, 2013, Notice and Translation. 9 pgs.

Notification of the Second Office Action, in corresponding Chinese Patent Application 201210279967.9, mailed by the State Intellectual Property Office of the People's Republic of China dated May 13, 2015, and English translation thereof.

First Office Action, in corresponding Japanese Patent Application 2014-005410, dated Aug. 19, 2014, and English translation thereof, 4 pgs.

Notification of the First Office Action, in corresponding Chinese Patent Application 201210279967.9, mailed by the State Intellectual Property Office of the People's Republic of China dated Oct. 24, 2014, and English translation thereof.

Notification of the Third Office Action in corresponding Chinese Patent Application 201210279967.9, mailed by the State Intellectual Property Office of the People's Republic of China dated Dec. 1, 2015, and English translation thereof.

Notification of Reasons for Refusal dated Jul. 12, 2016 by the Japanese Patent Office in related Japanese Application No. 2015-209305, and English translation thereof, 7 pgs.

* cited by examiner

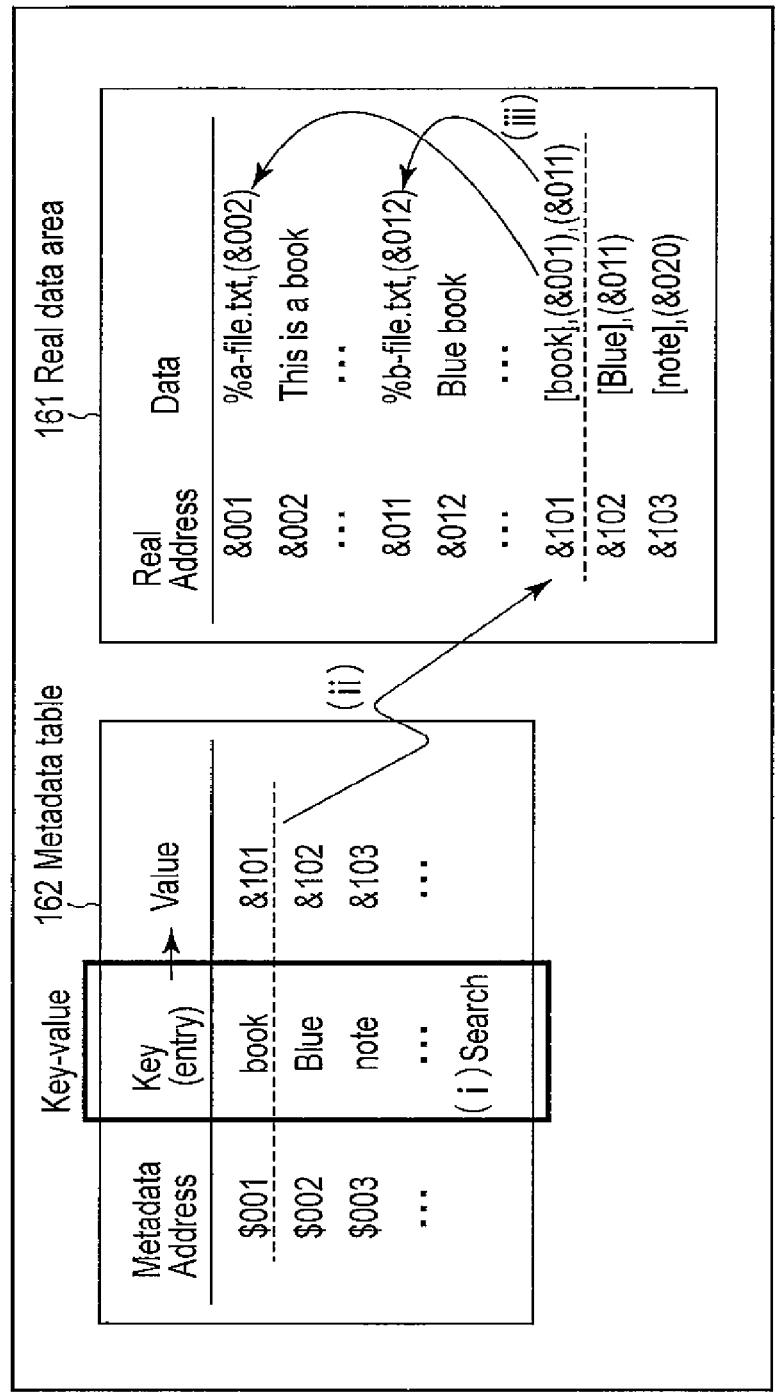
F I G. 1

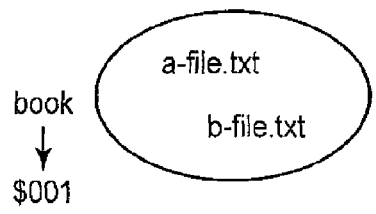 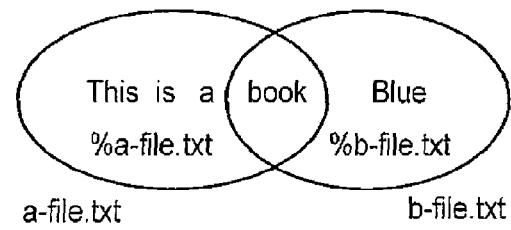
F I G. 2A        F I G. 2B

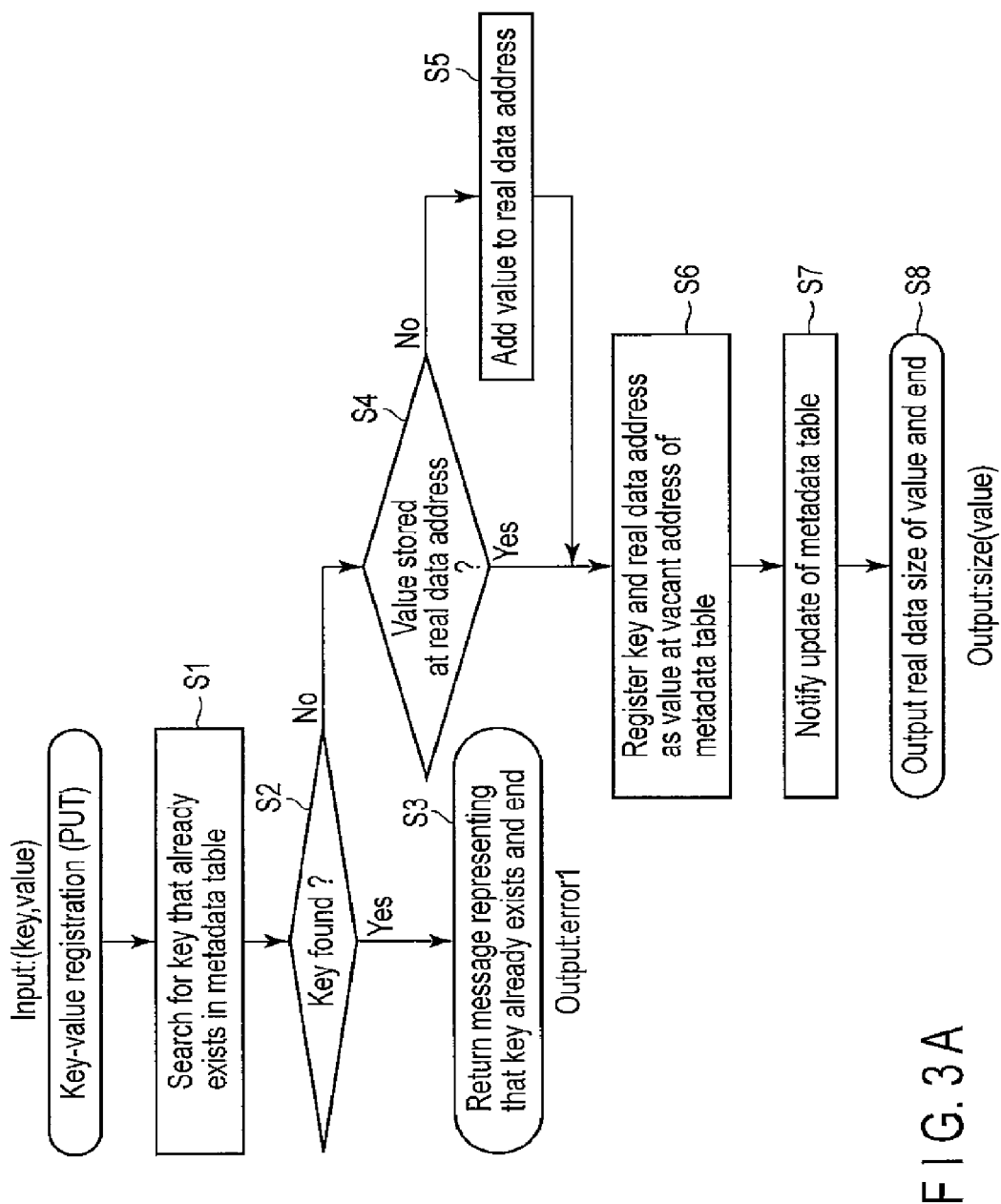
F I G. 3A

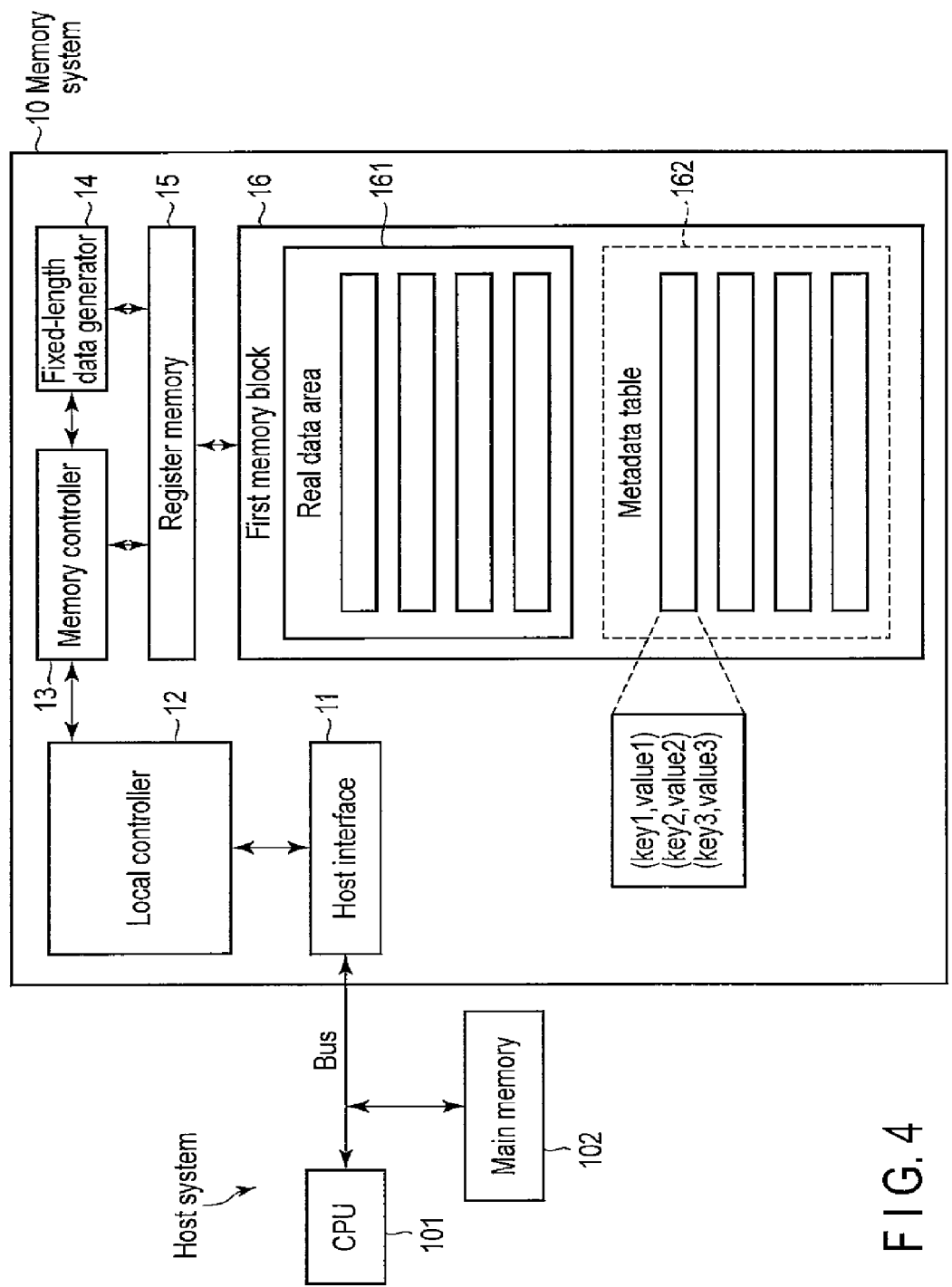
F I G. 4

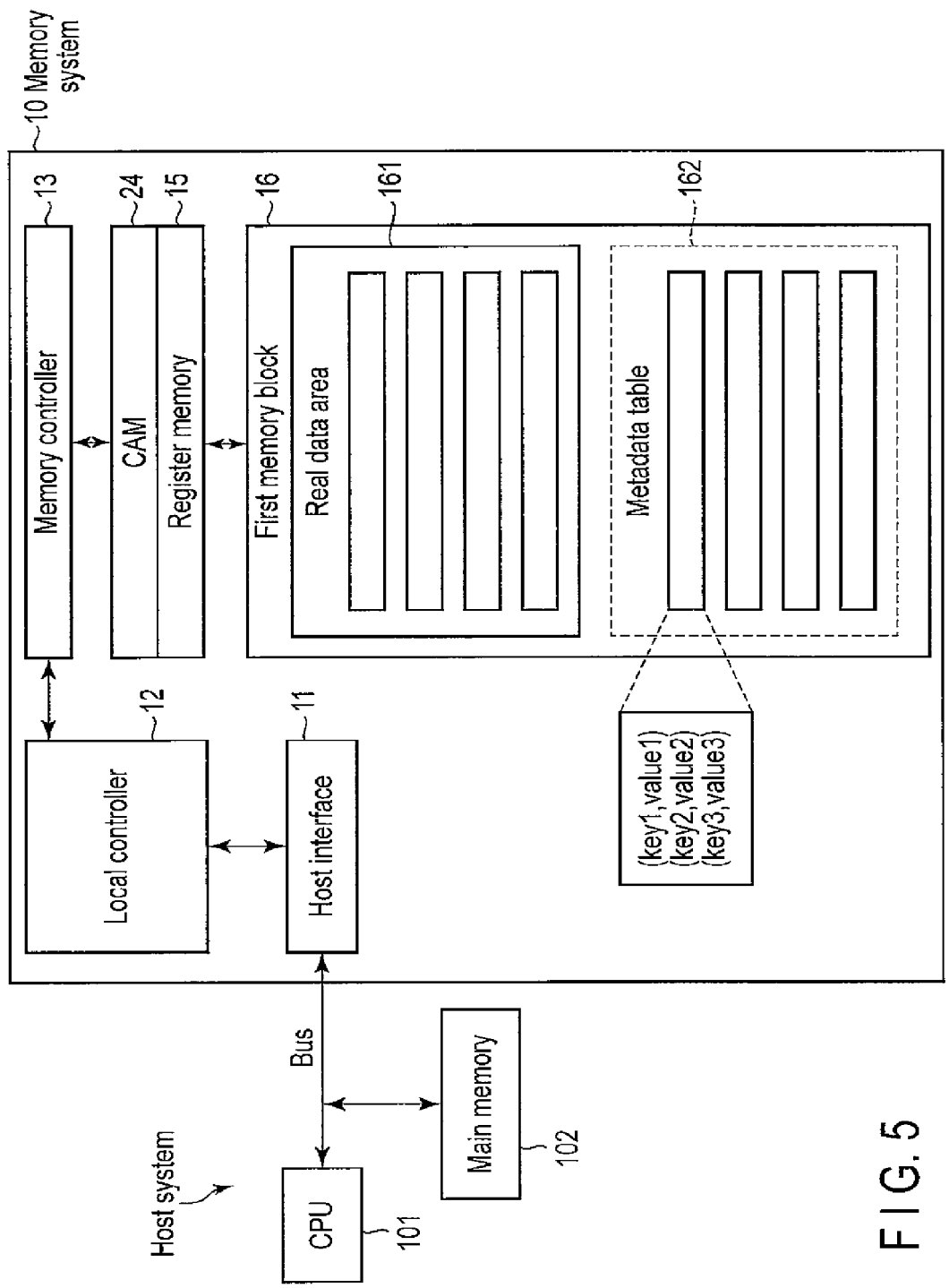
F I G. 5

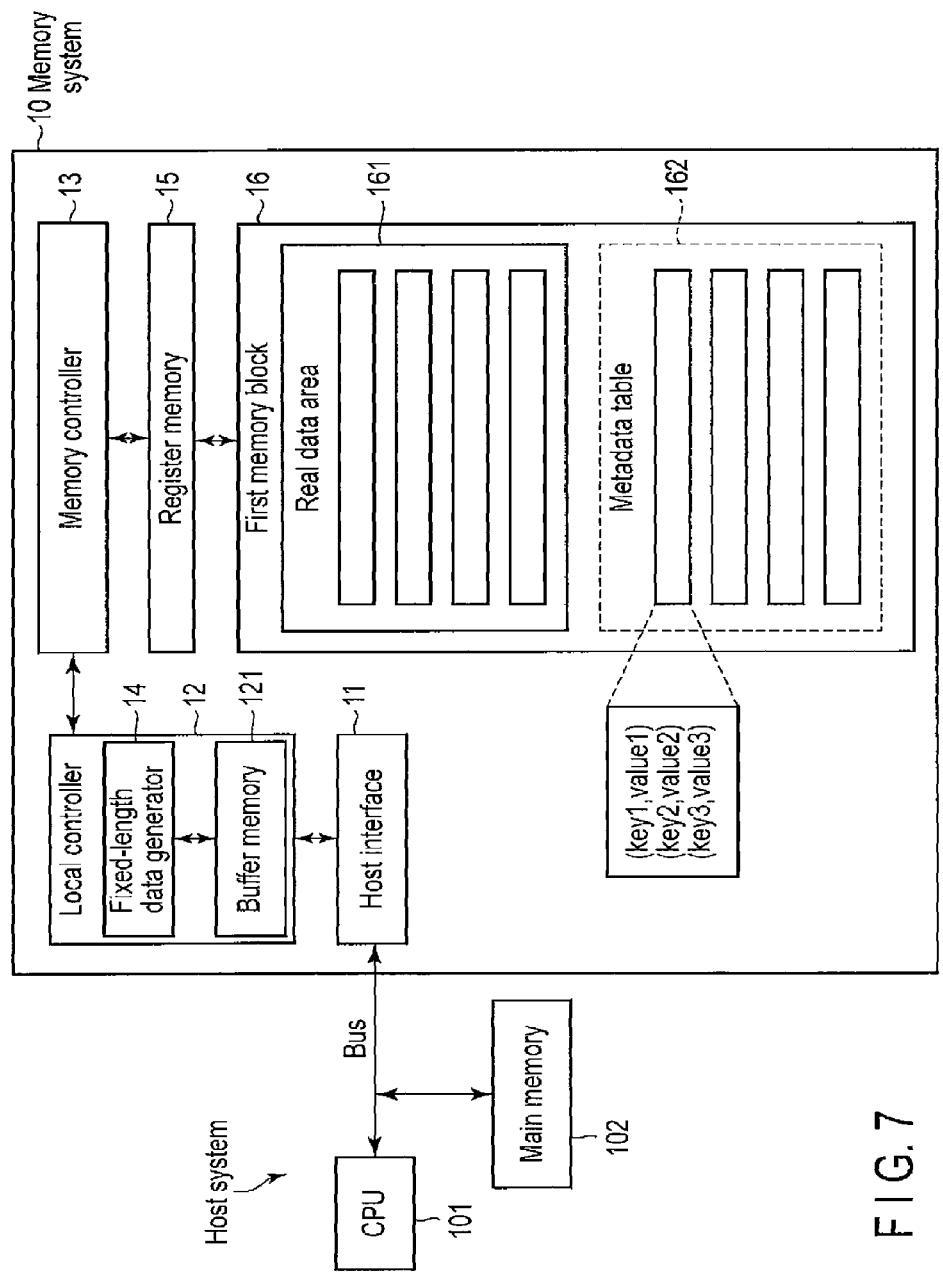
F I G. 7

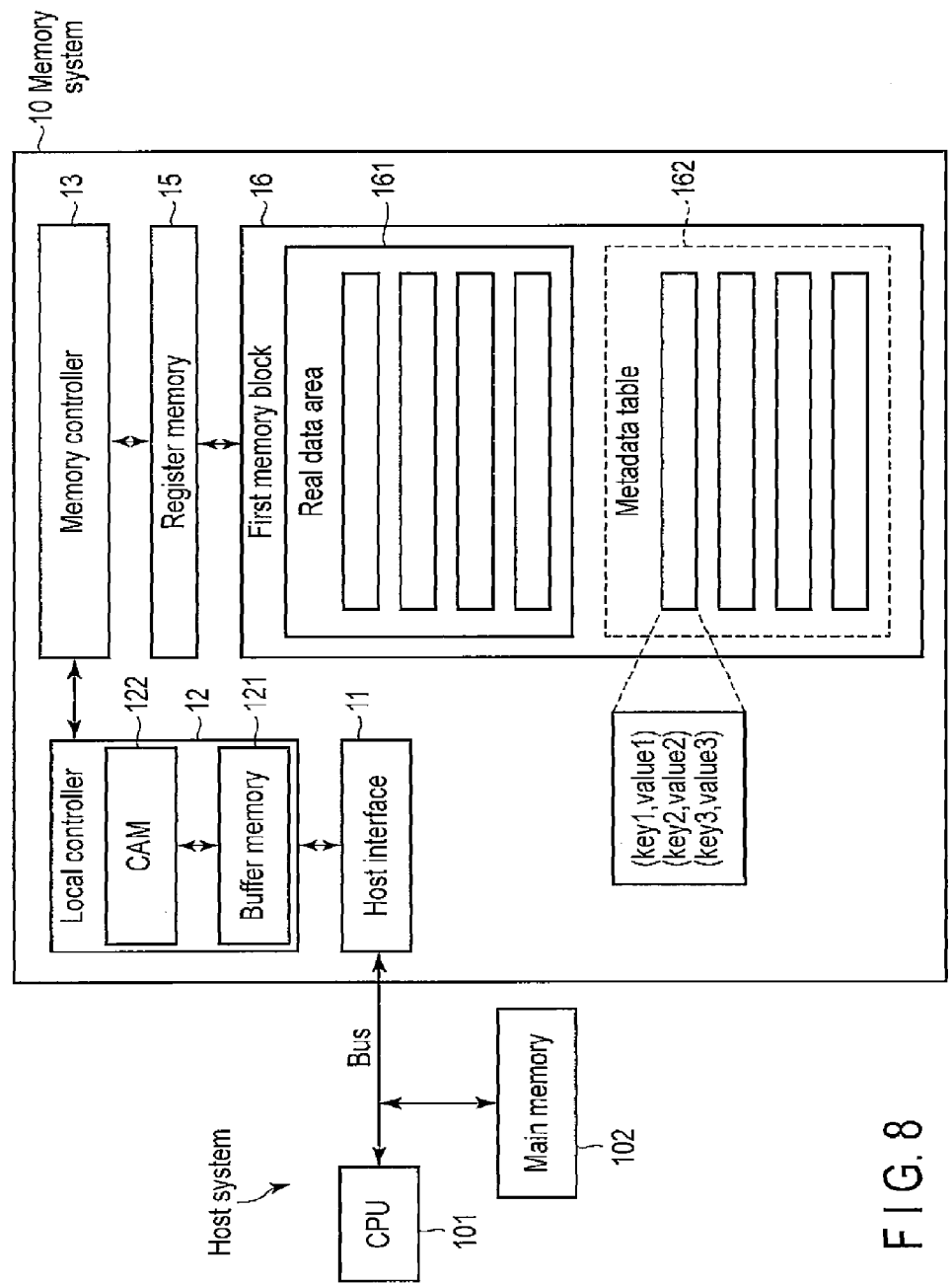
F I G. 8

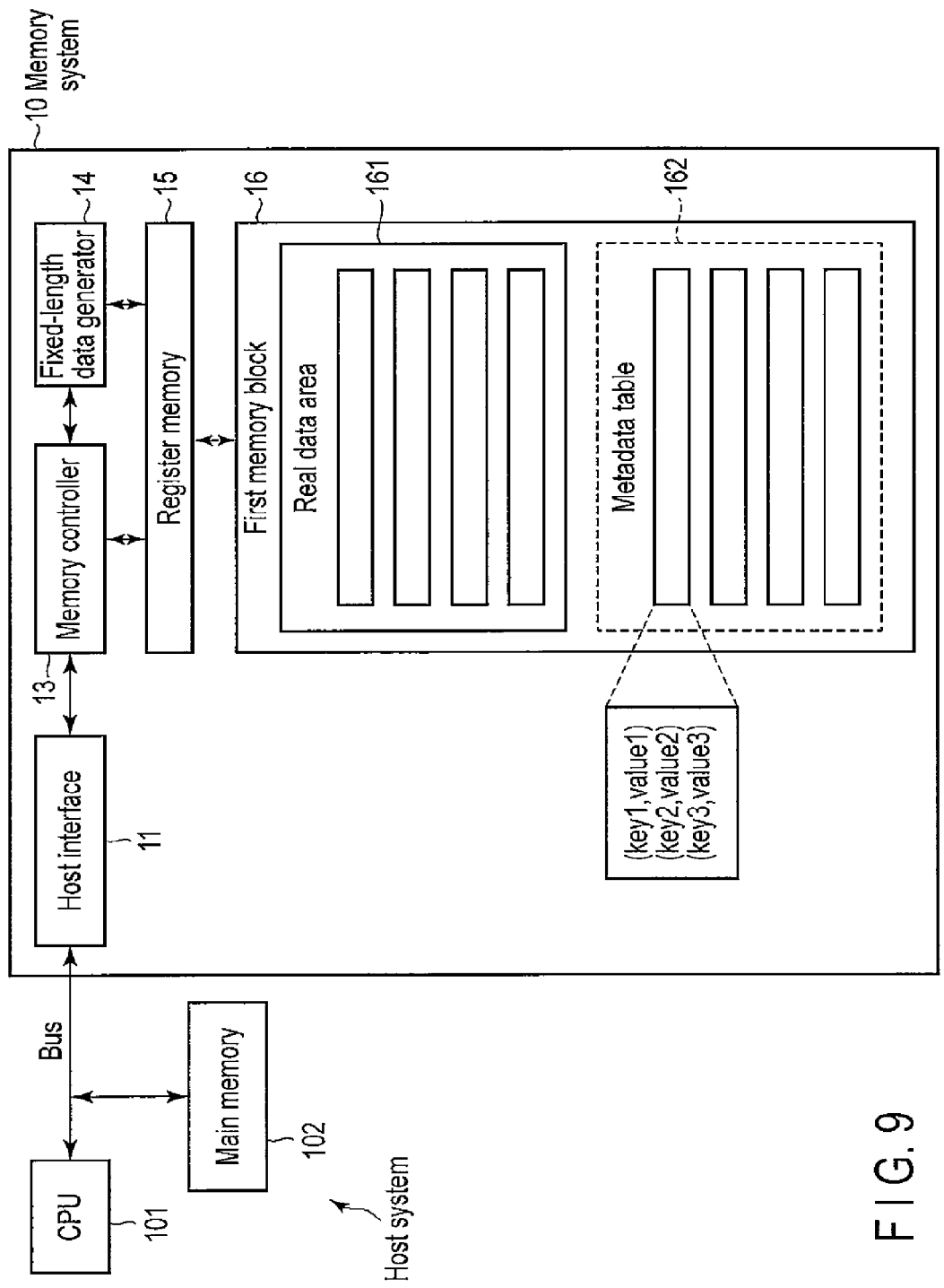
F I G. 9

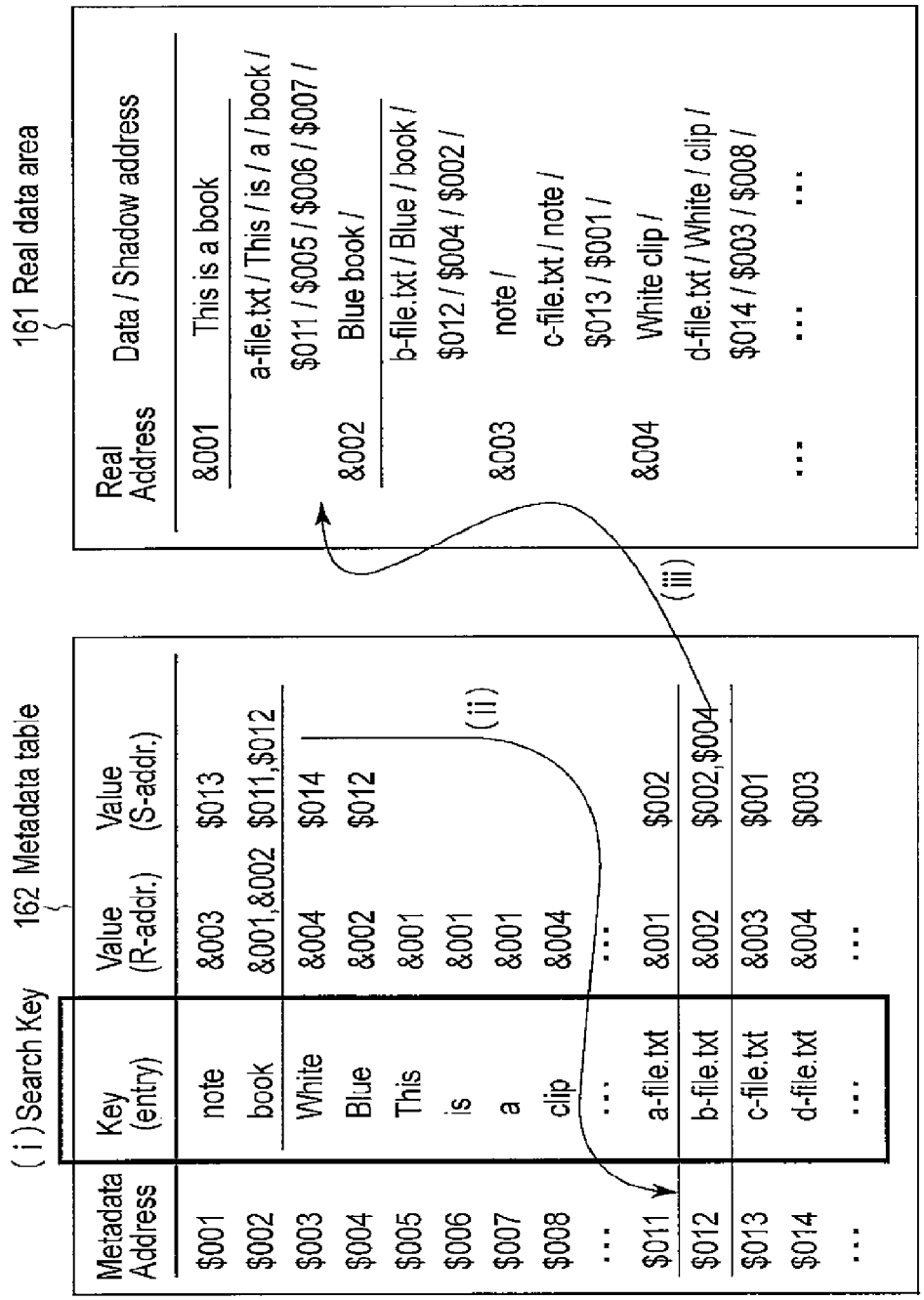
F I G. 12

FIG. 16

162 Metadata table

| Metadata Address | Search Key | |
|---|---|---|
| | Key (entry) | Value (R-address) |
| $001 | at | &100 |
| $002 | in | &101 |
| $003 | io | &102 |
| $004 | nn | &103 |
| $005 | no | &104 |
| $006 | n | &105 |
| $007 | on | &106 |
| $008 | ov | &107 |
| $009 | ti | &108 |
| $010 | va | &109 |
| ... | ... | ... |

161 Real data area

| Real Address | FlieI-ID, Data Group(R-addr.), position |
|---|---|
| &001 | i-file.txt, innovation |
| &002 | j-file.txt, good innovation |
| &003 | k-file.txt, invention |
| ... | ... |
| &100 | &001 / 6, &002 / 11 |
| &101 | &001 / 1, &002 / 6, &003 / 1 |
| &102 | &001 / 8, &002 / 13, &003 / 7 |
| &103 | &001 / 2, &002 / |
| ... | ... |

MEMORY SYSTEM INCLUDING KEY-VALUE STORE

This is a division of application Ser. No. 13/569,605, filed Aug. 8, 2012, which is incorporated herein by reference in its entirety.

CROSS-REFERENCE TO RELATED APPLICATIONS

This application is based upon and claims the benefit of priority from Japanese Patent Application No. 2011-172759, filed Aug. 8, 2011, the entire contents of which are incorporated herein by reference.

FIELD

Embodiments described herein relate generally to a memory system which is accessed by a host system and includes a key-value store.

BACKGROUND

As a storage device provided in a general host system, for example, a computer system, there exists a magnetic HDD (Hard Disk Drive) or an SSD (Solid-State Drive) including a nonvolatile semiconductor memory. Although the SSD is classified as a storage, it can also be regarded as a memory system with an extended scale and functions.

A memory system includes, for example, an interface, a first memory block, a second memory block, and a controller. The first memory block stores files as data, and the second memory block functions as a buffer memory in data write/read. The first memory block is nonvolatile and has a large capacity but a low access speed as compared to the second memory block. The second memory block is used to compensate for the speed difference between the communication speed of the interface and the write/read speed of the first memory block. For example, the first memory block is a nonvolatile flash memory, and the second memory block is a volatile DRAM or SRAM. Such a conventional storage type memory system has an arrangement for implementing a data write/read function by addressing.

On the other hand, to efficiently extract data such as another text associated with a given text, a specific bit pattern in a binary file, a specific pattern in a moving image file, or a characteristic voice pattern in a voice file stored in the memory system, a data read function by data designation is preferably imparted. For this purpose, a method is used to store not only normal data but also metadata associated with the data together and refer to the metadata to obtain desired data.

Metadata management methods are roughly classified into two types: a database type having a table format and a key-value store (KVS) in which data have a one-to-one correspondence. In the KVS, when a key is given as a search request, a value corresponding to the key is output.

To implement the KVS by the conventional system, management of data stored in the memory system or repetitive data input/output processing of expanding a plurality of metadata on the main storage device (DRAM) of the host system, performing an operation using the CPU (Central Processing Unit), and reading out the data from the storage again and collating them is executed.

The KVS in the conventional system and the problems thereof will be described.

To implement the KVS in a conventional SSD, data is stored as a file, and metadata that is key-value data (or key-value pair) belonging to the data is also stored as a file. That is, the key-value store is implemented by the host system equal to or higher than the level of the file system, that is, a file system or an application installed in the OS.

In this case, the key-value store can be implemented by a general-purpose hardware arrangement. However, since metadata is handled like normal data, the metadata read/write or search operation is performed after the host system has read out the metadata file to the main memory (for example, DRAM). This poses, for example, at least the following three problems.

First, the file access performance deteriorates. Since the size of the main memory is smaller than the size of the SSD in general, a metadata file larger than the main memory size cannot be handled in one go. For this reason, the metadata file is divided on a key basis, for example. A metadata file of an easy-to-handle size is read out to the main memory as needed and used. This process is repeated until a necessary key-value is obtained. File access to the SSD occurs as many times as the number of metadata files. If the file access speed of the SSD is lower than the speed of the metadata read request, the host system and the local system (memory system) are rate-limited as a whole.

Second, the load on the CPU increases. Since all of metadata creation, management, and collation (search) are performed by the CPU, a load is imposed on the CPU during metadata processing. Especially, when data is updated, corresponding metadata needs to be searched from metadata files and updated because metadata is created in correspondence with data. In addition, since a metadata search also needs to be performed by the CPU fully using a software algorithm, a load for metadata management is newly imposed on the CPU.

Third, the load on the bus or interface increases. As the result of the first and second problems, the host system and the local system (memory system) frequently exchange metadata information. Hence, the traffic on the bus and interface increases.

BRIEF DESCRIPTION OF THE DRAWINGS

FIG. 1 is a view schematically showing the relationship between a real data area and a metadata table in a first memory block and the mechanism of a key-value store;

FIGS. 2A and 2B are views showing the relationship between elements and sets in FIG. 1;

FIG. 4 is a block diagram showing the hardware arrangement of a memory system according to a first embodiment;

FIG. 5 is a block diagram showing the hardware arrangement of a memory system according to a second embodiment;

FIG. 7 is a block diagram showing the hardware arrangement of a memory system according to a fourth embodiment;

FIG. 8 is a block diagram showing the hardware arrangement of a memory system according to a fifth embodiment;

FIG. 9 is a block diagram showing the hardware arrangement of a memory system according to a sixth embodiment;

FIG. 12 is a view schematically showing a real data area and a metadata table according to a first modification;

FIG. 16 is a view schematically showing a real data area and a metadata table according to a fourth modification.

DETAILED DESCRIPTION

Figure 3:
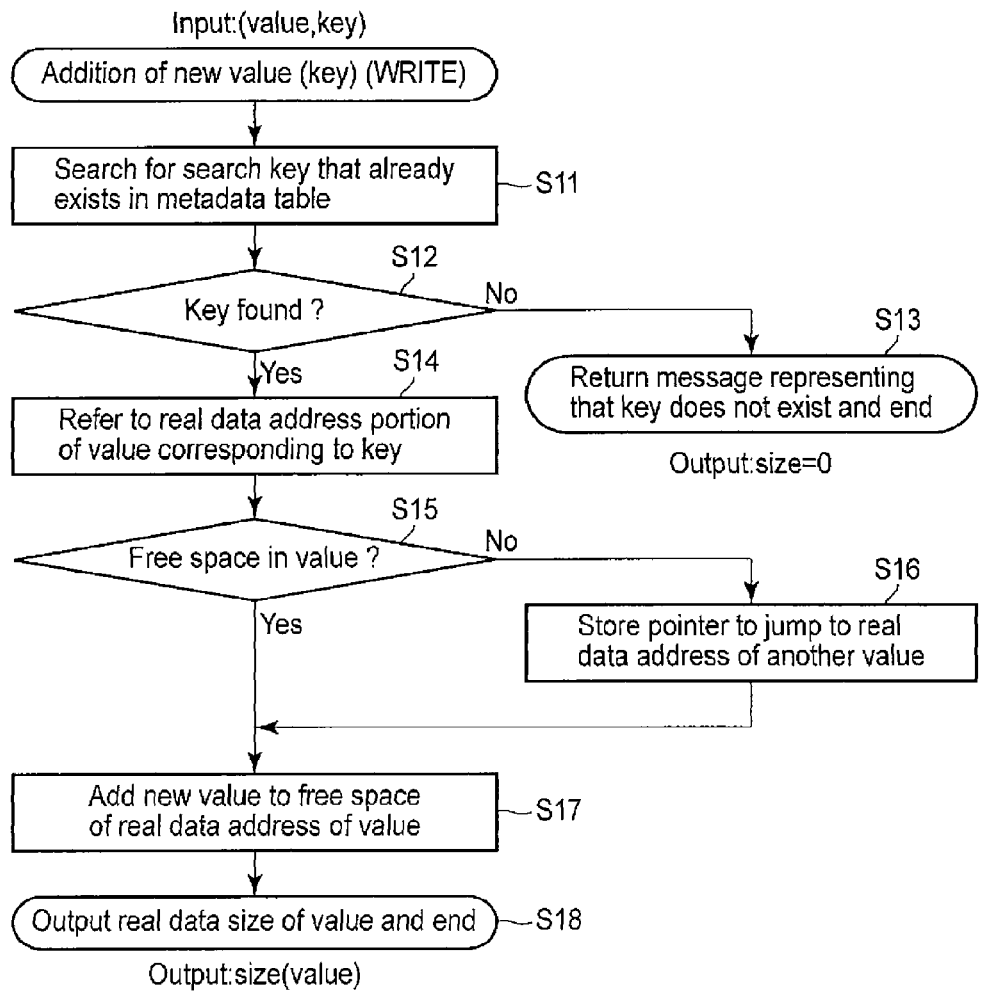
FIGS. 3A, 3B, 3C, and 3D are flowcharts showing a detailed processing procedure in the key-value store.

In general, according to one embodiment, a memory system including a key-value store containing key-value data as a pair of a key and a value corresponding to the key, includes an interface a first memory block, an address acquisition and a controller. The interface receives a data write/read request or a request based on the key-value store. The first memory block has a data area for storing data and a metadata table containing the key-value data. The address acquisition circuit acquires, in response to input of the key, a first address at which the key-value data is stored.

The controller executes the data write/read request for the first memory block by designating an address, and outputs the first address acquired by the address acquisition circuit to the first memory block and executes the request based on the key-value store. The controller outputs the value corresponding to the key via the interface.

In the following description, the same reference numerals denote the constituent elements having almost the same functions and arrangements, and a repetitive description will be made only when necessary.

Metadata stored in a memory system is stored by a key-value store. Embodiments that provide an efficient storage method and arrangement of the key-value data will be described with reference to the accompanying drawing.

<Metadata Table and Key-Value Store>

A metadata table and a key-value store, which are the fundamental principles of this embodiment, will be explained first.

FIG. 1 schematically shows the relationship between a real data area and a metadata table in a first memory block and the mechanism of a key-value store. Note that the numerical values and symbols are used for descriptive convenience and do not always correspond to the embodiment.

As shown in FIG. 1, a real data area (real address space) 161 of addressing and a metadata table 162 exist in a memory-accessible physical address space. The real data area 161 directly corresponds to the logical address space of a conventional concept. The metadata table 162 is not explicitly accessed in normal use of a user or a client because it is a data area to be used on the memory system side as needed. However, explicit access is permitted for a test command to the system. The user basically inputs a request to operate real data or metadata to the memory system using an interface command. The memory system internally performs processing and returns a signal or data to the user (host system) as a response.

The memory system discriminates the real data area 161 and the storage area of the metadata table 162 in a logical address-physical address translation table to be used to translate a logical address into a physical address. A metadata address in the metadata table 162 is created as needed. Hence, if there is no key-value data creation request, a metadata address may be absent in the first memory block.

As described above, the metadata table 162 can exist in the memory system of this embodiment with a storage capacity that is not fixed but can be varied (increased or decreased) arbitrarily in accordance with a request based on the key-value store. For this reason, the user can use the accessible physical memory space at the maximum efficiency while arbitrarily handling metadata. To put it in extreme terms, no metadata may be handled at all. In this case, the physical memory space can be used at the maximum.

Conversely, if metadata is utilized sufficiently, the metadata table 162 may be expanded to a size equal to or larger than the real data area 161. In this case as well, since metadata management is the work on the memory system (local system) side, the host system side is released from the metadata management. Hence, the user (host system side) need not be aware of metadata management in normal use.

The metadata table 162 stores key-value pairs. However, the entities of data exist in the real data area (real address space) 161.

The relationship between the metadata table 162 and the real data in the real data area 161 will be described using a detailed example of data extraction by the key-value store.

The key-value store (KVS) is a database management method of writing sets of keys and values and reading out a value by designating a key. Although the KVS is often used via a network, the data storage destination is surely a certain local memory or storage system. Even metadata is stored in the real data address space.

Data is read out normally by designating the start address of the memory that stores the data. Data can take the form of a file. In some file systems, the real data address space is managed for, for example, every 512-byte sector. Alternatively, if the file system need not be limited, the real data address space may be managed in 4 or 8 KB, which is the read/write page size of, for example, a NAND flash memory.

FIG. 1 conceptually illustrates a state in which the real data area 161 stores files (data) corresponding to real addresses. For example, the file ID "% a-file.txt" of a file "a-file.txt" is stored at a real data address &001. The file content "This is a book" is stored at &002. In actuality, the real data addresses are generally managed on the byte basis. Hence, continuation of &001 and &002 is a special example.

The metadata table 162 in FIG. 1 shows stored key-value pairs. A key is a search target element or set extracted from a data file. In this example, a key is a set including elements &001 and &011. Value is a value to be returned when the key is found. In this example, a set of file IDs of data files including a word "book" is stored as a value in the form of a real data address space.

The will be described in accordance with the procedure shown in FIG. 1.

(i) A key is input as an entry, and the metadata table is searched for a value.

(ii) Since a value corresponding to the found key is a real data address at which a set to which the key belongs is stored, the real data address is referred to.

(iii) Data written at the referred real data address is output.

The relationship between the real data address and the metadata table and the relationship of the key-value pairs are the relationships between elements and sets as shown in FIGS. 2A and 2B.

That is, in a normal file, as shown in FIG. 2B, for example, a file having a file name "a-file.txt" is a set, and each word of text data "This is a book" is an element. The file ID is also an element.

In the metadata table (metadata address space), however, the relationship between the set and the elements can be reversed and rearranged, as shown in FIG. 2A. That is, the relationship is converted into an "inverted" relationship. In the set "book", file names "a-file.txt" and "b-file.txt" are stored as elements. In the key-value data, the rearranged set name ("book") is searched for to obtain the elements ("a-file.txt" and "b-file.txt"). In general, this is an inverted file creation and search procedure executed in full text search in itself, and a practical example of key-value data.

An inverted file is an index file for a search to be used in an inverted index method that is one of the methods of implementing a full text search function. In the inverted index method, an index data file called an inverted file that stores a list of files including content is created for each piece of content in advance. The contents of inverted files are updated periodically in one go or every time a file is added or deleted. For a content search request, the contents of an inverted file corresponding to the search target content are output as a search result. For this reason, the contents of all files need not be checked in every full text search. It is therefore possible to speed up the search. The inverted file is an example of key-value data. Note that the embodiment is not limited to this.

<Commands of Key-Value Store>

The host system gives the next commands for a key-value store request to the host interface of the memory system.

Commands for a request based on the key-value store include a command (PUT) to register a new set (value) associated with a key, a command (WRITE) to add a new element (value) to a set (value) associated with a key, a command (GET) to store an element of a set (value) associated with a key in a buffer and return its size, and a command (READ) to read out an element (value) stored in the buffer.

The command names may be changed as needed. A new command for a request based on the key-value store may be added. For example, a command to arrange elements (values) belonging to a set (key) or a command to instruct, for example, rearrangement of sets (keys) in the metadata table or comparison of the elements (values) may be added.

In this embodiment, the metadata table and the real data area are cooperated in accordance with a command request. Detailed procedures of key-value data addition, search, and the like using the commands are illustrated in the flowcharts of FIGS. 3A, 3B, 3C, and 3D.

(1) To register new key-value data (PUT), as shown in FIG. 3A, a search is performed to check whether the key already exists in the metadata table (steps S1 and S2). If the key is found, an error is returned to the output. That is, a message representing that the key already exists is returned, and the processing ends (step S3).

On the other hand, if the key is not found, the process advances to processing of the value. A search is performed to check whether the value is stored in the real data area (real data address) (step S4). If the value is not stored in the real data area at the registration timing of the key-value data, the value is added to the real data area (step S5). If the value is stored, the key is directly stored in the metadata table, and the real data address of the value is registered in association with the key (step S6).

When the logical address-physical address translation table is managed in the memory system, the functional circuit that manages the table is notified of the update of the metadata table (step S7). Finally, the real data size of the value is output, and the processing ends (step S8).

(2) To add a new value to an already existing key (WRITE), as shown in FIG. 3B, a search is performed to check whether the key exists in the metadata table (steps S11 and S12). If the key is not found, for example, size=0 is returned to the output to notify nonexistence of the key (step S13).

On the other hand, if the key is found, a storage location designated by the real data address stored in the value corresponding to the key is referred to (step S14), and the new value is added to the storage location. First, it is checked whether a free space exists in the storage location of the value (step S15). If no free space exists in the storage location of the value, a pointer to be used to jump to the real data address of another value is stored (step S16). Next, the new value is added to the storage location designated by the address (step S17).

If a free space exists in the storage location of the value, the new value is added to the free space of the storage location of the real data address of the value (step S17). Finally, the real data size of the value is output, and the processing ends (step S18).

Figure 3C:
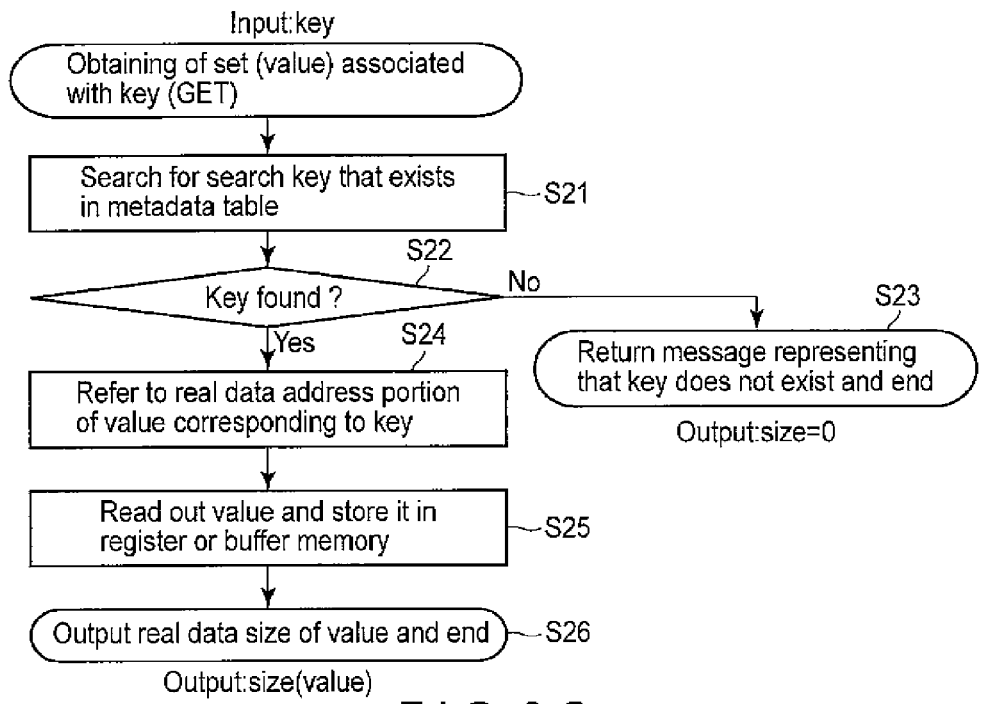

(3) To obtain a set (value) associated with a key (GET), as shown in FIG. 3C, a search is performed to check whether the key exists in the metadata table (steps S21 and S22). If the key is not found, for example, size=0 is returned to the output to notify nonexistence of the key (step S23).

On the other hand, if the key is found, a storage location designated by the real data address stored in the value corresponding to the key is referred to (step S24). A value stored in the storage location of the real data address is read out and stored in a buffer memory or a register memory (step S25). Finally, the real data size of the value is output, and the processing ends (step S26).

Figure 3D:
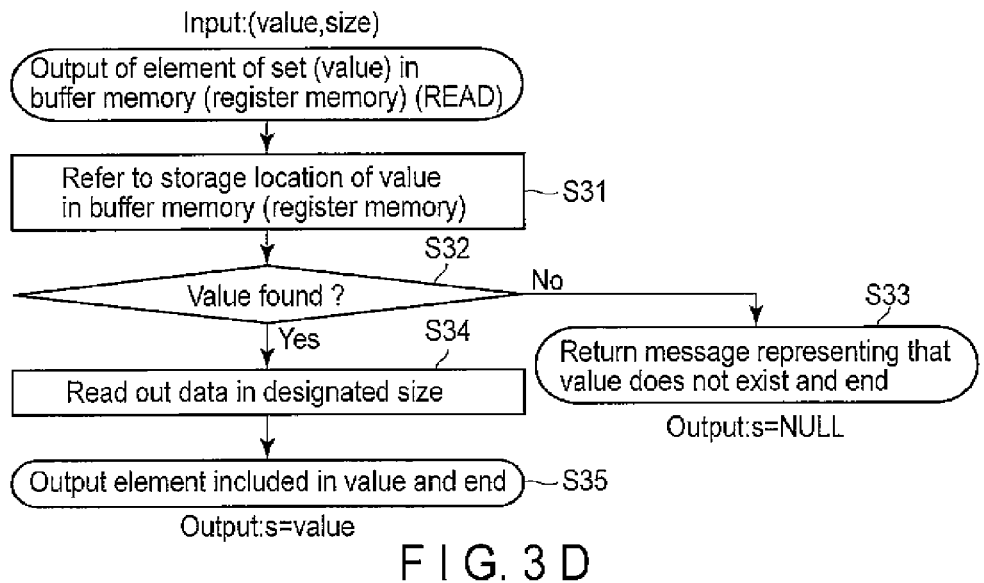

(4) To output an element of a set (value) stored in a buffer memory (or a register memory) (READ), as shown in FIG. 3D, the storage location in the buffer memory where the element of the set (value) is stored is referred to (step S31). It is checked whether the element of the set (value) exists (step S32). If the element of the set (value) is not found, for example, S=NULL is returned to the output to notify nonexistence of the element of the set (value) (step S33).

On the other hand, if the element of the set (value) is found, the element of the set (value) corresponding to the designated size is read out (step S34). The readout element of the set (value) is output, and the processing ends (step S35). An example in which the element is read out by designating the size has been described above. Actually, the read may be done by specifying the location in the buffer memory.

Note that in the procedure (3), the start address of the real data address of the value may be returned to the host system. This is convenient in reading out the real data of the value because the procedure (4) is usually performed after the procedure (3). How to define the procedure depends on the definition of the command set, and this is not limited to that described above because the key-value store procedure has been explained using a detailed command set in the present application. The other procedures are not limited to those described above, either.

When the memory system uses a Hash-CAM, keys and values do not always match. That is, keys and values are not always associated with each other. Note that the Hash-CAM will be described later in detail.

For this reason, in the Hash-CAM, a procedure of referring to a value corresponding to a key and determining whether the key matches the real data is added to the procedure of searching the metadata table for a key. If the key does not match the real data, the search is performed again by designating a metadata address in another key range in accordance with the address management rule (for example, checking an adjacent address) of the key-value store in the Hash-CAM.

Note that the actual procedure and commands are not limited to those described above. The method can be varied such that, for example, if a plurality of keys are found in the actual operation, a flag is set temporarily, and the values are read in one go.

As described above, for example, a command to arrange elements (values) belonging to a set (key) or a command to instruct, for example, rearrangement of sets (keys) in the metadata table or comparison of the elements (values) may be added.

Note that keys and values can be sets and elements or vice versa. Alternatively, since keys and values have a one-to-one correspondence, both may be sets or elements.

In this embodiment, the host interface can receive the search command or a local controller or memory controller can receive the search command via the host interface and execute the series of processes of the key-value store. A DMAC (Direct Memory Access Controller) may be added to the local controller or memory controller in the memory system. In this case, the memory system can mainly control the key-value store operation. In some cases, the memory system can mainly access another memory (for example, the main memory of the host system) outside the memory system.

First Embodiment

A detailed hardware arrangement of this embodiment will be described below with reference to the accompanying drawing as needed.

The hardware arrangement of a memory system according to the first embodiment will be described.

FIG. 4 is a block diagram showing the hardware arrangement of the memory system according to the first embodiment.

As shown in FIG. 4, a memory system (or local system) 10 includes a host interface 11, a local controller 12, a memory controller (or chip controller) 13, a fixed-length data generator 14, a register memory (which is also known as a cache memory, page register, R/W register, page cache, or the like) 15, and a first memory block 16.

A host system is connected to the host interface 11 of the memory system 10 via, for example, a bus such as AMBA, SATA, PCIe, or USB. The host system includes a CPU 101 and a main memory 102.

The first memory block 16 contains a real data area 161 and a metadata table 162 extracted from the real data area 161. The metadata table 162 has key-value data.

The key-value data of the metadata table 162 stores, as a list, keys that are metadata associated with data and the start addresses (values) of the real data addresses of the associated data. For example, the above-described inverted file or the like can be formed using the key-value data.

As the first memory block 16, for example, a NAND flash memory that is a kind of nonvolatile semiconductor memory is used. The NAND flash memory can be formed from either one chip or a plurality of chips to increase the storage capacity. Any other solid-state chip LSI having storage nonvolatility such as an MRAM (Magnetic Random Access Memory) or an ReRAM (Resistive Random Access Memory) is also usable as the first memory block 16. However, the first memory block 16 is not limited to those.

The host interface 11 can receive, from the host system, normal data operation requests, that is, data write and read requests by designating an address and write and read requests to key-value data in the metadata table 162.

The write and read requests to the first memory block 16 are received and controlled by the memory controller 13. The fixed-length data generator 14 and the register memory 15 are connected between the memory controller 13 and the first memory block 16. The register memory 15 is also called a page register, R/W register, page cache, or the like and is temporarily used as a storage area in write or read. Especially, the register memory 15 has an arithmetic function and is generally used to control the multilevel operation of the NAND flash memory. In this embodiment as well, the register memory 15 is used in a similar manner.

As a feature of this embodiment, the fixed-length data generator 14, for example, a hash generator is provided, which is used for write and read of key-value data in the first memory block 16. The hash generator functions as an address acquisition circuit that acquires the address of the storage location of key-value data in response to key input. The hash generator can be regarded as an electronic circuit having a function of generating a hash function. However, a dedicated circuit may be used, or a hash function algorithm may be input to a general-purpose arithmetic circuit.

Hash values (addresses) generated by the hash generator may collide. The memory controller 13 includes a comparison circuit or address management circuit for processing after hash value collision. A data storage/search method using the fixed-length data generator (hash generator) 14 and the address management circuit will be described later. An example has been described above in which the memory controller 13 and the fixed-length data generator 14 are separately formed. However, the memory controller 13 may include the fixed-length data generator 14.

The arrangement of this embodiment also includes the local controller 12 to control signal transmission/reception between the host interface 11 and the first memory block 16. The local controller 12 can include an ECC (Error Correction Code) circuit for data output from the first memory block 16. Note that if the memory controller 13 includes the ECC circuit, the local controller 12 need not include it.

The local controller 12 can have a function of managing a logical address-physical address translation table function that translates a logical address of the first memory block 16 into a physical address. This allows the local controller 12 to manage the correspondence between the logical addresses and the real data area 161 and the metadata table 162. That is, the local controller 12 discriminates the storage areas of the real data area 161 and the metadata table 162 in the logical address-physical address translation table. For this reason, the storage areas of the real data area 161 and the metadata table 162 need not be separated and may be mixed in the first memory block 16.

The local controller 12 may include a second memory block for these processes. Alternatively, the second memory block may be connected to the outside of the local controller 12 via a bus line.

The existence of the second memory block is self-evident in a conventional SSD. However, nonexistence of the second memory block is not necessarily inconvenient for the description of the minimum arrangement of this embodiment. Hence, the second memory block is not illustrated in FIG. 4. However, if the local controller 12 can use the second memory block, the metadata table can be read out from the first memory block 16 to the second memory block and referred to.

Note that the second memory block is also used to compensate for the difference between the communication speed of the host interface 11 and the access speed of the first memory block 16. For this reason, a memory that is nonvolatile and has a small capacity but a high access speed as compared to the first memory block 16 is used as the second memory block.

For example, a nonvolatile DRAM or SRAM is used as the second memory block. If a similar speed and capacity can be obtained, a nonvolatile RAM (Random Access Memory), for example, an MRAM (Magnetoresistive Random Access Memory), ReRAM (Resistance-change Random Access Memory), FeRAM (Ferroelectric Random Access Memory), PCRAM (Phase-Change Random Access Memory) or the like may be used. A memory system that uses a flash memory as the first memory block 16 generally has a wear leveling function that uses the local controller 12, the second memory block, and the logical address-physical address translation table. This may be used in this embodiment.

<Data Storage/Search Method Using Hash Function>

A data storage/search method using the fixed-length data generator (hash generator) 14 of this embodiment and the address management circuit will be described. The address management circuit is provided in the memory controller 13 to perform processing of avoiding collision of hash values (addresses).

In this embodiment, since the hash generator is provided, arbitrary-length bit data can be converted into fixed-length bit data. An example will be described here in which the hash generator generates the metadata address of fixed-length data bit data from the metadata of arbitrary-length bit data using this function.

A cryptographic hash function that is as uniform and coarse as possible is preferably used as the hash function. For example, SHA-1 (Secure Hash Algorithm-1), SHA-2 (Secure Hash Algorithm-2), MD4 (MessageDigest4), MD5 (MessageDigest5), or the like is used.

The hash generator has a function of obtaining a bit string having a fixed bit length as a hash (<key>) from a given <key> having an arbitrary length in accordance with the hash function and further shortening the bit length to a desired bit length (BitLength). For example, the hash generator has a division function represented by <key ID>=hash(<key>) mod BitLength Alternatively, data having a desired length may simply be cut out from the start of the generated bit string having the fixed bit length and used.

The length of the thus generated key ID is made equal to the address length of the metadata table. This allows to directly use the address as the address of the metadata table. For example, referring to FIG. 1, when 001 is obtained as the result of generation of fixed-length bit data "book" (to be referred to as hash ("book") hereinafter) by the hash generator, the address $001 of the metadata table corresponds to the key "book". A corresponding value is stored at the address $001.

For "Blue" as well, when 002 is obtained as the result of hash ("Blue"), a value corresponding to metadata address $002 is stored. Keys and values are stored in this way.

To search for a key, for example, "book", since the output value (hash value) "001" of the hash function directly indicates the metadata address of the storage location, the address is directly referred to. The data reference method using the correspondence between the hash function and the memory address will be referred to as a Hash-CAM.

In the Hash-CAM, even if a hash function that is as coarse as possible is used, the possibility that the hash values (addresses) collide is not zero from the viewpoint of probability theory. The most simple and effective method to practically reduce the possibility of hash value collision is to prepare a sufficiently large memory space. In actuality, however, collisions can occur because the memory size is limited. To obtain a processing function after collision, a comparison circuit and an address management circuit which have the following functions are provided. When hash values collide, the comparison circuit extracts data by referring to the contents of the value and performs comparison/collation to check whether the extracted data matches the key. If the extracted data matches the key, the address management circuit changes the hash value (address).

For example, assume that when storing another key "note" in addition to the above-described key, the result of hash ("note") is 001. Since $001 is already used for "book", jumping to another metadata address is necessary. For example, the address is moved to an adjacent metadata address, that is, the address is incremented. In the example of FIG. 1, since $001 collides, it is checked whether $002 is vacant. However, $002 is also already used by hash ("Blue"). Hence, the next address $003 is checked. If $003 is vacant, a value corresponding to "note" is stored at that address.

Using this method enables to store data even if hash values collide. However, a contrivance is needed to search for key-value data. When searching for "note", if hash ("note") is 001, the metadata address $001 is referred to. In this case, however, the value of already stored "book" is erroneously obtained.

To prevent this, collation needs to be always performed to check whether the correspondence between the key and the value is correct. The value of "book" is the real data address &101. Hence, the data is read out by referring to &101. Since [book] is stored as the start data, it is found that the key-value pair is not that of "note". To search for the key-value pair of "note", collation is similarly performed for the next metadata address $002 to find that the key-value pair is not that of "note". As a result, it is found that the next metadata address $003 indicates the correct key-value pair. As described above, even if hash values collide, key-value data can be searched for.

Note that since [book], [Blue], and [note] of the real data portion need to only undergo key collation, the first several bytes may substantially be cut out and used as fixed-length data, such as "bo" for book, "Bl" for Blue, and "no" for note. In this case as well, caution is required because the possibility of collision is not zero for the fixed-length data.

A method of incrementing the address after collision is used above. However, as will be described later in a modification, using this embodiment makes it possible to refer to a real data address from a value corresponding to a key even if the key, that is, the address collides. Hence, a method of storing the key itself in the real data address and collating the key is also usable. Even in this case, collation between a key as a search entry and a key in real data is necessary. An address management circuit serving as a Hash-CAM is also necessary. Hence, although the method is slightly different, the same arrangement as that of the above-described Hash-CAM is usable.

As described above, the hash generator generates a hash value (address). In addition, the address management circuit adds the procedure of avoiding hash value collision to metadata storage. This allows to efficiently implement the key-value store in the memory system 10.

In this embodiment, to implement the Hash-CAM, a hardware function (fixed-length data generator) is provided, and the memory controller 13 includes a circuit for avoiding collision of fixed-length data (addresses). The hardware function (fixed-length data generator) may be provided in the memory controller 13. At this time, storage of key-value data can be done in the register memory 15 or directly be performed for the first memory block 16.

Note that in the above-described arrangement, if the key-value store function is not damaged, temporary storage of the logical address-physical address translation table and the wear leveling processing need not always be done in the memory system 10 and may be performed by the host system fully using the CPU and the main memory. To cause the memory system 10 to mainly perform the key-value store, a DMAC (Direct Memory Access Controller) may be provided.

In this embodiment, the functional blocks are connected by a bus line. Basically, a fast and efficient bus line arrangement is preferably constructed in the memory system. Two or more types of bus lines may be used in the memory system because of, for example, the difference between the chip interface standard and the external interface standard.

According to this embodiment, it is possible to provide a memory system that uses key-value data for metadata associated with data to enable to simply perform processing of extracting data from the memory system at a high speed and which allows the user to use the accessible physical memory space at the maximum efficiency while arbitrarily handling metadata. That is, it is possible to provide a memory system that receives an operation request for metadata and efficiently processes and outputs it by the key-value store in the memory system at a high speed.

Second Embodiment

The hardware arrangement of this embodiment is partially different from that of the first embodiment, and includes a hardware CAM having a memory space dedicated to key collation.

FIG. 5 is a block diagram showing the hardware arrangement of a memory system according to the second embodiment.

A memory controller 13 controls signal transmission/reception between a local controller 12 and a first memory block 16. The memory system includes a register memory 15 for write/read for the first memory block 16. It is possible to temporarily store a search request in the register memory 15 and perform matching determination of read. Parallel read and matching determination are performed on the byte basis. For search data having an arbitrary length, matching determination can be done by performing sequential processing.

In this embodiment, as shown in FIG. 5, a CAM (Content-Addressable Memory) 24 is arranged at a position accessible from the memory controller 13. The CAM is a special memory for a high-speed search, which simultaneously performs comparison operations in parallel to determine match/mismatch between input search data and all stored data and outputs the address of matched stored data, unlike a normal memory that outputs data designated by an input address. In this case, the CAM 24 functions as an address acquisition circuit that acquires an address at which key-value data corresponding to an input key is stored. The CAM can output the presence/absence of matched data as "Match Flag" in the data matching search. In this embodiment, the CAM 24 is implemented by an electronic circuit for implementing these functions and is therefore called a hardware CAM.

The hardware CAM is directly connected to the register memory 15 and arranged between the memory controller 13 and the register memory 15. An example has been described above in which the memory controller 13 and the CAM 24 are separately formed. However, the memory controller 13 may include the CAM 24.

In addition, since the first memory block 16 is a RAM (random access memory), the CAM 24 and the first memory block 16 function as a CAM-RAM. The CAM-RAM is a system in which above-described CAM 24 outputs an address, and the RAM that is accessed by an address outputs data. The address decoder of the CAM and the address encoder of the RAM are designed such that one entry of the CAM and one entry of the RAM correspond in a one-to-one correspondence.

In this embodiment, a key is stored in the CAM 24, and a corresponding value is stored in the first memory block 16 or the value is read out from the first memory block 16 to the register memory 15 and stored as a RAM unit. This allows the CAM and the first memory block to function as a CAM-RAM.

To use the hardware CAM, a metadata table needs to be transferred from the first memory block 16 to the register memory 15. When such a CAM-RAM is used, address collision as in the Hash-CAM of the first embodiment does not occur in principle.

Hence, since the key-value collation procedure and search re-execution do not occur, the search becomes faster. In the Hash-CAM, the metadata addresses have a margin in many cases as a means for avoiding collision. However, since no collision occurs in the hardware CAM, the CAM 24 can efficiently be used.

In this embodiment, the CAM 24 is used for only key search of key-value data. Since the CAM is connected to the page register (register memory) of data input/output, the physical address space of the first memory block can be used at the maximum without being partially occupied by the key-value data. The rest of the arrangements and effects are the same as those of the above-described first embodiment.

Third Embodiment

In this embodiment, a hardware CAM having a memory space dedicated to key collation is provided, as in the second embodiment. However, the hardware CAM is provided in a first memory block 16.

Figure 6:
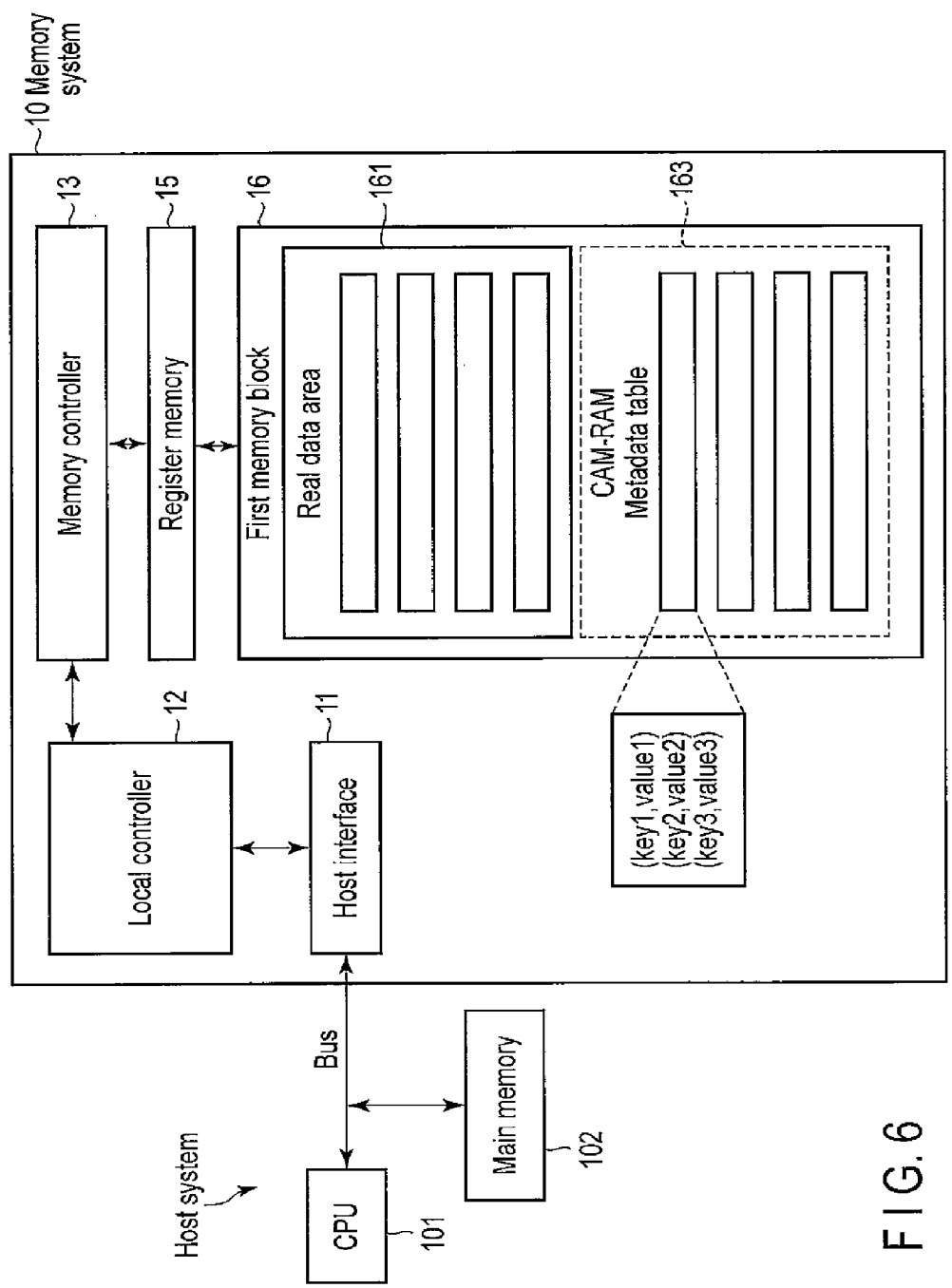
FIG. 6 is a block diagram showing the hardware arrangement of a memory system according to a third embodiment.

FIG. 6 is a block diagram showing the hardware arrangement of a memory system according to the third embodiment.

As shown in FIG. 6, the first memory block 16 includes a real data area 161, and a CAM-RAM 163 that stores a metadata table. The manner in which the CAM-RAM is used is the same as in the second embodiment. In the third embodiment, however, part of the first memory block 16 serves as an address space dedicated to the CAM. This makes it possible to directly search for a key stored in the metadata table without moving it to the outside of the first memory block 16.

Providing a configuration that enables collation data to be given to the storage cell unit of the first memory block 16 enables to perform a full parallel search. For example, if the first memory block 16 is formed from a NAND flash memory, the read circuit is configured to give an input as search data simultaneously to all gates in the region used as the CAM unit. This enables to detect the output of only a NAND string where a hit is found. A CAM-RAM is implemented by making the output correspond to the page address of the RAM unit. The rest of the arrangements and effects are the same as those of the above-described first embodiment.

Fourth Embodiment

In this embodiment, a fixed-length data generator (for example, hash generator) is provided, as in the first embodiment. However, the place the fixed-length data generator is installed is different from the first embodiment. A local controller 12 includes a fixed-length data generator 14.

FIG. 7 is a block diagram showing the hardware arrangement of a memory system according to the fourth embodiment.

As shown in FIG. 7, the fixed-length data generator 14 is arranged in the local controller 12. The fixed-length data generator 14 and the local controller 12 need not always physically exist in the same chip. The local controller 12 need only be located at a position to more easily access the fixed-length data generator 14 than the other functional blocks.

The local controller 12 includes a buffer memory 121 serving as a second memory block. For this reason, the local controller 12 can store, in the buffer memory 121, a logical address-physical address translation table read out from the first memory block 16 and perform logical address-physical address translation. Similarly, the local controller 12 can perform wear leveling processing of a NAND flash. The local controller 12 can also manage the correspondence between a metadata table 162 and logical addresses.

As a feature of this embodiment, the fixed-length data generator 14 is provided in the local controller 12. Hence, generating a hash value from a key and making it correspond to a value, that is, creation of key-value data of the metadata table 162 can efficiently be done in the local controller 12 at the time of logical address-physical address translation.

In this embodiment, a Hash-CAM operation can be performed in the buffer memory 121 that is the second memory block or in a first memory block 16. The latter is the same as in the first embodiment, and a description thereof will be omitted. The former will be described.

To create a metadata table, data is read out from the first memory block 16 and stored in the buffer memory 121 to generate a hash value. Since the Hash-CAM operation is performed in the buffer memory 121, the metadata address is made to correspond to a physical address of the buffer memory 121.

The created metadata table is written back to the first memory block 16 or held in the buffer memory 121 that is the second memory block. This allows to refer to the key-value data in the metadata table.

If the metadata table has a smaller size than that of the buffer memory 121, the key-value data can be referred to in the buffer memory 121 that is faster than the first memory block 16. Hence, the search becomes faster.

If the buffer memory 121 is formed from a nonvolatile RAM, the memory system can be powered off without writing back metadata to the first memory block 16. Even after the memory system is powered on again, the metadata table is stored in the buffer memory 121. For this reason, processing of reading out the metadata table from the first memory block 16 is unnecessary. Hence, the speed can be improved as a whole. The rest of the arrangements and effects are the same as those of the above-described first embodiment.

In this embodiment, the functions necessary for the Hash-CAM are provided around the local controller. However, the Hash-CAM operation need not always be performed in the buffer memory and may be performed in the first memory block, as in the first embodiment. If the metadata table is small, the operation can be speeded up by performing the Hash-CAM operation after all data are read out to the buffer memory table. However, if the metadata table is larger than the buffer memory size, the operation speed may be increased by performing the Hash-CAM operation directly in the first memory block.

Fifth Embodiment

In this embodiment, key-value data is referred to in a buffer memory 121 that is a second memory block, as in the fourth embodiment. However, a local controller 12 includes a hardware CAM.

FIG. 8 is a block diagram showing the hardware arrangement of a memory system according to the fifth embodiment.

As shown in FIG. 8, a CAM 122 is connected to the buffer memory 121. FIG. 8 illustrates the buffer memory 121 and the CAM 122 separately. However, they may physically be connected.

The output (hit signal) of the CAM 122 is directly connected to part (for example, about ½ the memory capacity) of the buffer memory 121 so that the CAM 122 and part of the buffer memory 121 form a CAM-RAM. This enables to read out data by designating data (content).

When the hardware CAM 122 is used, address collision as in a Hash-CAM does not occur in principle. Hence, since the key-value collation procedure and search re-execution do not occur, the search becomes faster.

Since the buffer memory 121 is more accessible but has a smaller memory capacity than a first memory block 16, the memory space needs to be used efficiently. In this embodiment, when the CAM 122 is added, the memory space of the buffer memory 121 can be used at the maximum efficiency. The rest of the arrangements and effects are the same as those of the above-described second embodiment.

Sixth Embodiment

In this embodiment, the hardware arrangement is almost the same as that of the first embodiment except that a memory system 10 includes no local controller.

FIG. 9 is a block diagram showing the hardware arrangement of a memory system according to the sixth embodiment.

As shown in FIG. 9, a host interface 11 is directly connected to a memory controller 13.

The method of implementing a key-value store is the same as in the first embodiment except the handling of the logical address-physical address translation table. Since a memory system 10 includes neither a local controller nor a second memory block, the logical address-physical address translation table is read out from a first memory block 16 and handled outside the memory system 10, for example, in a main memory 102.

Since a Hash-CAM operation is performed fully using a fixed-length data generator 14 in the memory controller 13, as in the first embodiment, key-value data storage in a metadata table 162 is done in the memory system 10. Not only the key-value data but also a change point of the metadata table 162 is returned to the host system, reflected on the logical address-physical address translation table, and written back to the first memory block 16 as needed.

In this embodiment, since the functions are simplified by omitting the buffer memory and the local controller in the memory system 10, the memory system itself is compact.

Note that to cause the memory system 10 to mainly perform the key-value store, a DMAC (Direct Memory Access Controller) may be provided and caused to control data transfer between the memory system 10 and the main memory 102. The rest of the arrangements and effects are the same as those of the above-described first embodiment.

Seventh Embodiment

In this embodiment, the hardware arrangement is almost the same as that of the second embodiment except that a memory system 10 includes no local controller.

Figure 10:
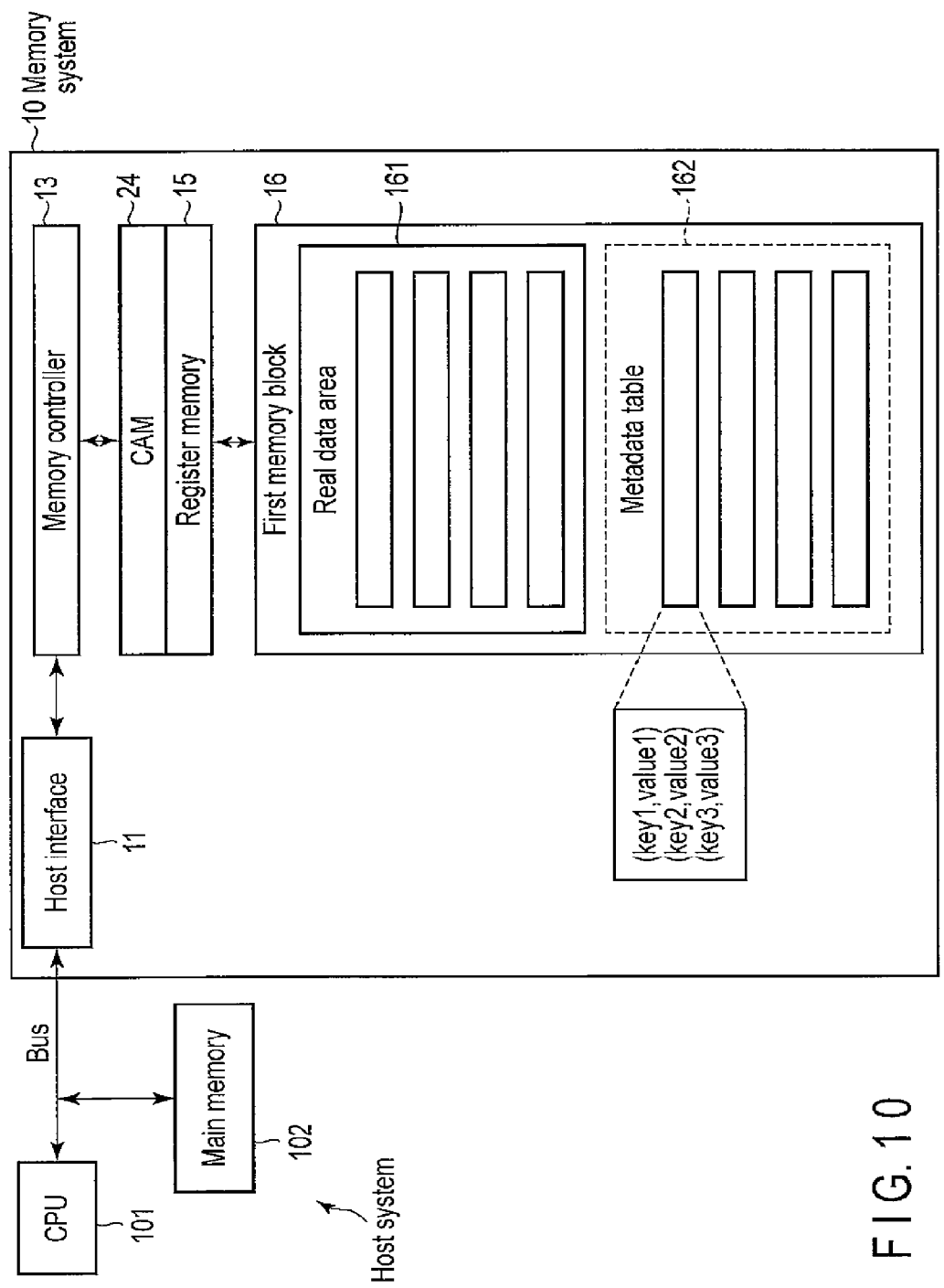
FIG. 10 is a block diagram showing the hardware arrangement of a memory system according to a seventh embodiment.

FIG. 10 is a block diagram showing the hardware arrangement of a memory system according to the seventh embodiment.

The method of implementing a key-value store using a hardware CAM is the same as in the second embodiment. The features of the functions obtained by the absence of the local controller are the same as in the sixth embodiment, and a description thereof will be omitted.

Eighth Embodiment

In this embodiment, the hardware arrangement is almost the same as that of the third embodiment except that a memory system 10 includes no local controller.

Figure 11:
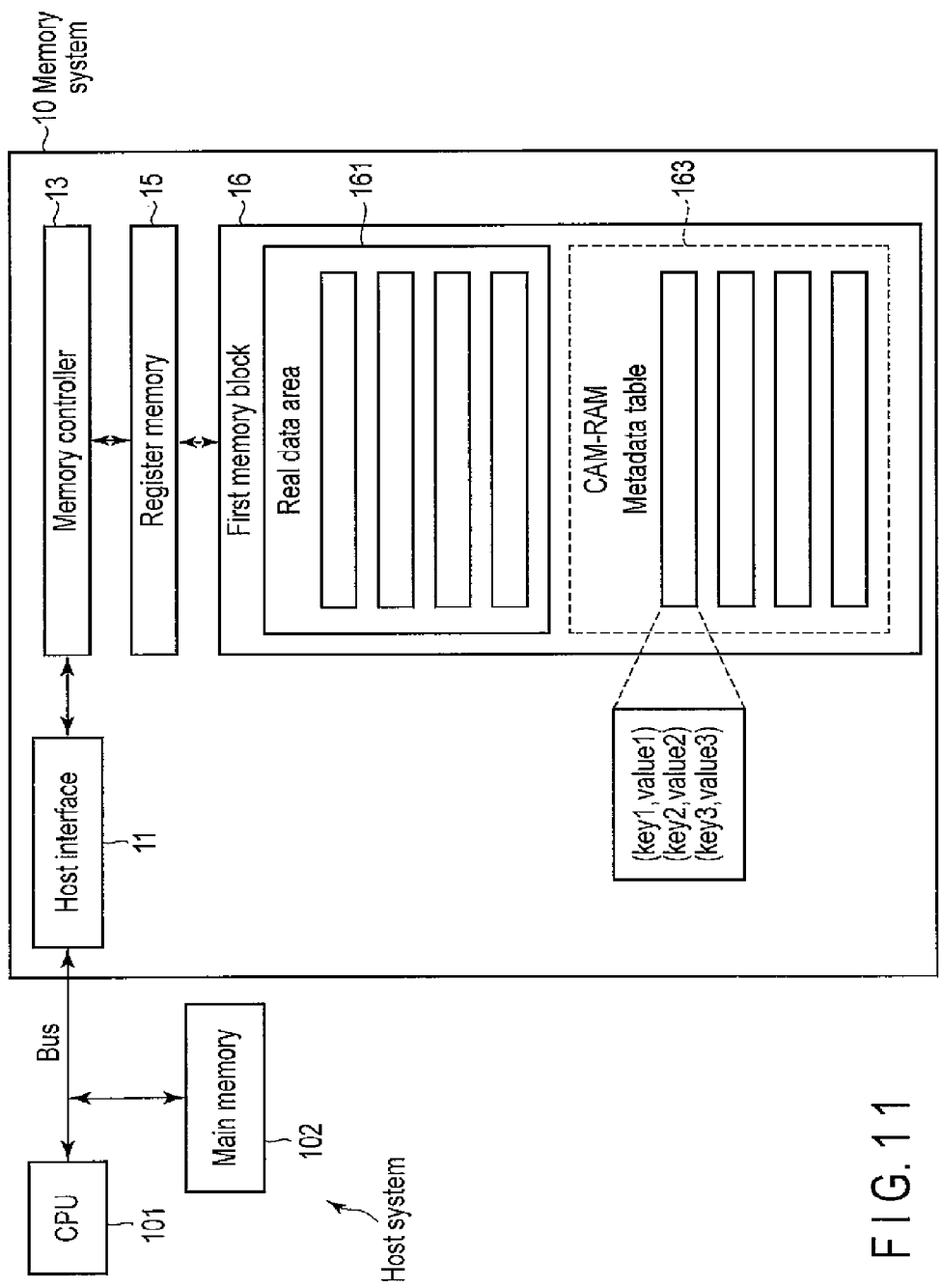
FIG. 11 is a block diagram showing the hardware arrangement of a memory system according to an eighth embodiment.

FIG. 11 is a block diagram showing the hardware arrangement of a memory system according to the eighth embodiment.

The method of implementing a key-value store using a CAM-RAM is the same as in the third embodiment. The features of the functions obtained by the absence of the local controller are the same as in the sixth embodiment, and a description thereof will be omitted.

As described above, in the embodiments, the mechanism of a key-value store is implemented by metadata and a table thereof, and a hash generator (Hash-CAM) or hardware CAM (CAM-RAM) serving as a searching device.

When implementing the key-value store in the above-described first to eighth embodiments, the following modifications are also available. The modifications will be described below in detail. Note that in the present application, the embodiments are interpreted more preferentially than the modifications.

[First Modification]

FIG. 12 is a view schematically showing the relationship between the real data area 161 and the metadata table 162 in the first memory block 16 and the mechanism of the key-value store according to the first modification.

In the real data area 161 shown in FIG. 12, a data file, a file name or file ID corresponding to the file, a key extracted from the file, and a metadata address at which the key is stored are stored at each real data address. Such a storage method can be implemented by an instruction from the host system or by providing a key extraction function and a metadata address assignment function in the memory system 10 in advance.

The metadata table 162 stores keys extracted upon storing a file at a real data address, and as values corresponding to the keys, the real data addresses at which the keys exist and metadata addresses at which other key-value data associated with the keys are stored.

With this address management, when the local controller 12 or the memory controller 13 instructs to search for a key, the memory controller 13 searches for the key from the metadata address.

For example, to obtain a file name including "book", "book" is searched for first from the metadata address. "book" is stored at a metadata address $002. Real addresses &001 and &002 and metadata addresses $011 and $012 are obtained as values from the metadata address $002.

The read addresses can be returned as the search result. In addition, the name of a set to which "book" belongs can be obtained by following the metadata addresses of the values. For example, at $011, a key "a-file.txt" and the real data address and metadata address of values corresponding to the key can be obtained.

In this way, the value (real data) necessary as the search result can be obtained by continuously following the metadata table 162. In this modification, only keys exist in the metadata table. Actual keys are stored at real addresses in the real data area 161.

[Second Modification]

Figure 13:
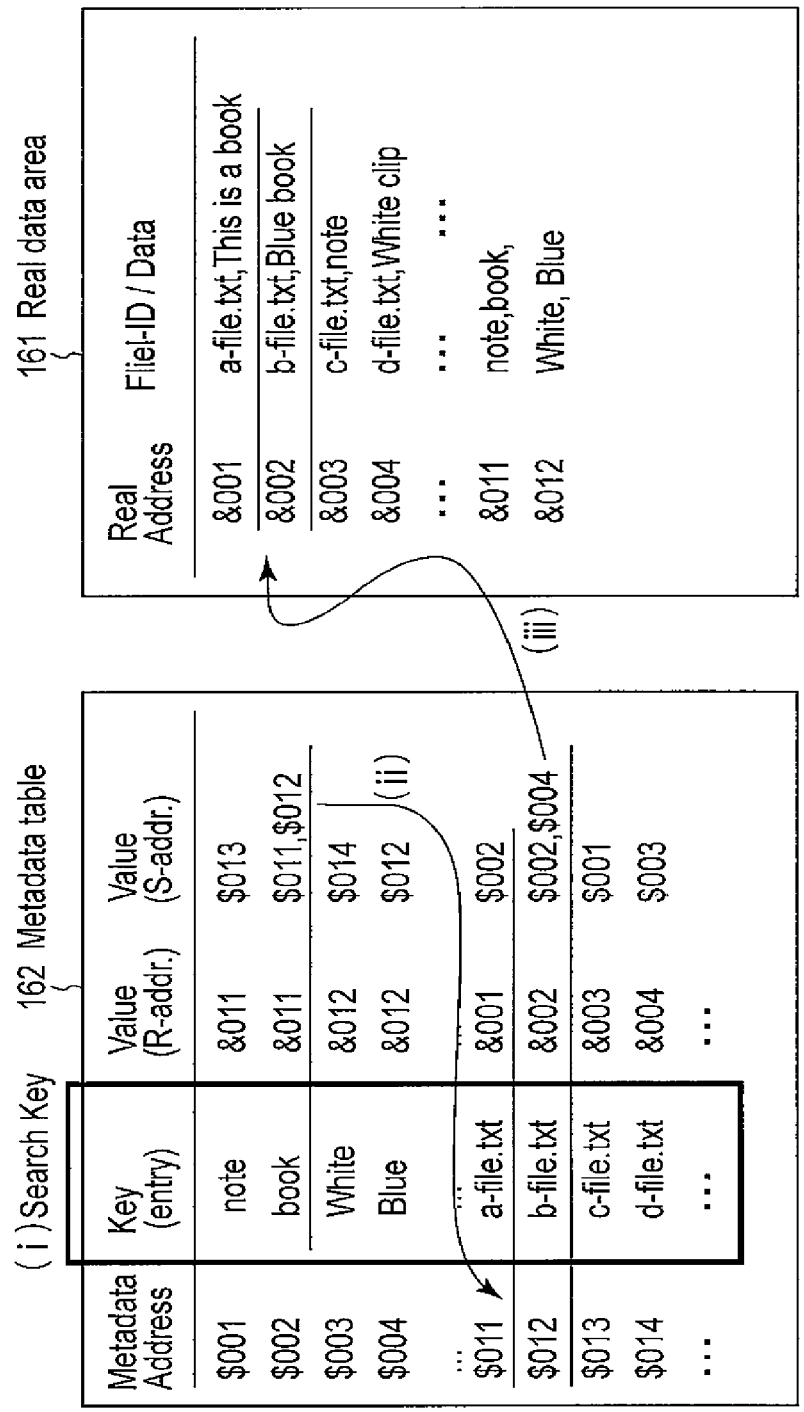
FIG. 13 is a view schematically showing a real data area and a metadata table according to a second modification.

FIG. 13 is a view schematically showing the relationship between the real data area 161 and the metadata table 162 in the first memory block 16 and the mechanism of the key-value store according to the second modification.

In the real data area 161 shown in FIG. 13, a file and a file name or file ID corresponding to the file are stored at each real data address. The metadata table 162 stores keys extracted from the files, and as values corresponding to the keys, the real addresses at which the keys exist and metadata addresses at which other sets or elements associated with the keys are stored.

As in the first modification, when the local controller 12 or the memory controller 13 instructs to search for a key, the memory controller 13 searches for the key from the metadata address.

For example, to obtain a file name including "book", "book" is searched for first from the metadata address. "book" is stored at a metadata address $002. A real data address &011 and metadata addresses $011 and $012 are obtained as values from the metadata address $002.

The real data address indicates not the storage location of the file to which "book" belongs but the storage location in the real data address of the key. On the other hand, each metadata address of the value indicates the set to which "book" belongs. Hence, the real data addresses of the values of $011 and $012 are obtained and returned as the search result by following the metadata addresses. Alternatively, data at &001 and &002 are returned by following the real data address. In the second modification, the data amount per address in the real data area (read address space) 161 is smaller than in the first modification.

[Third Modification]

Figure 14:
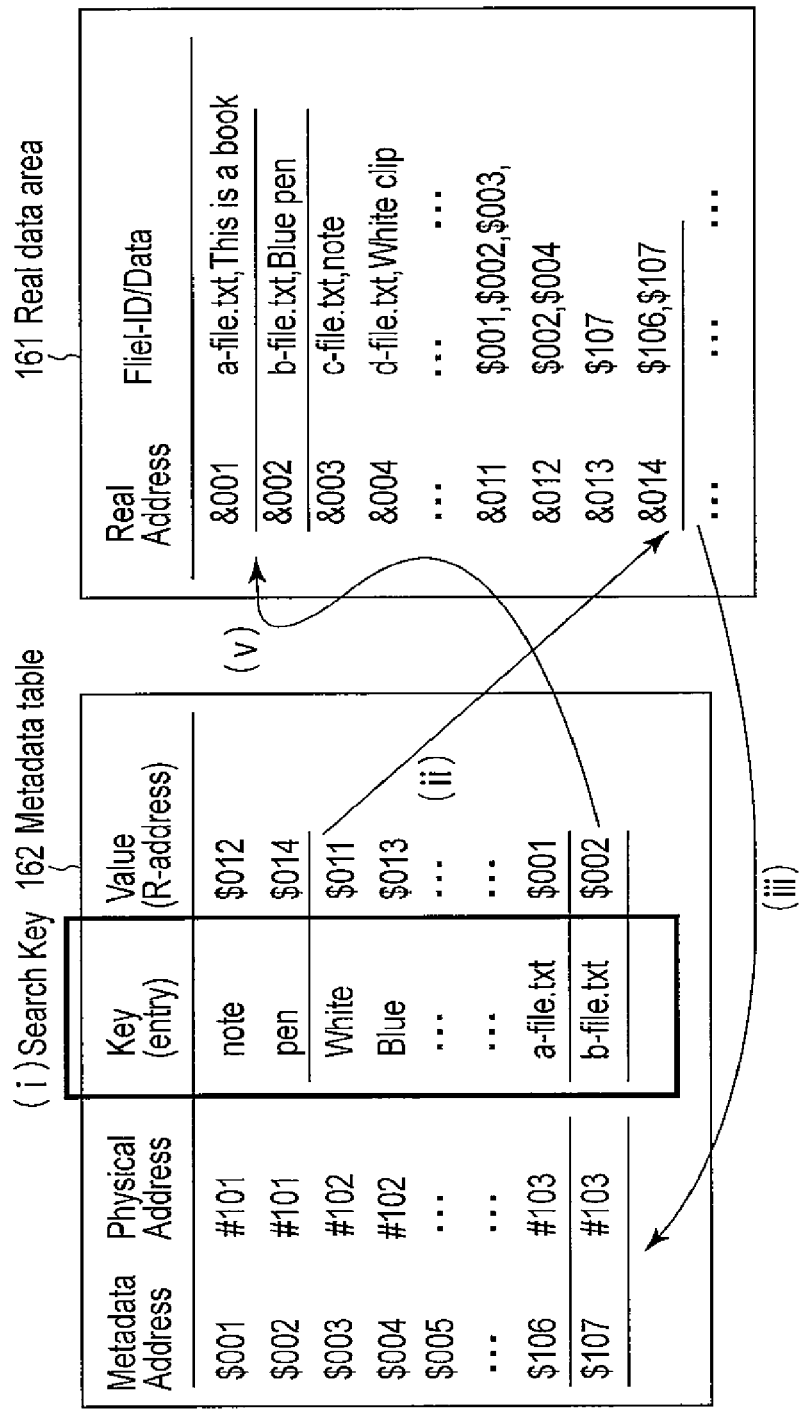
FIG. 14 is a view schematically showing a real data area and a metadata table according to a third modification.

FIG. 14 is a view schematically showing the relationship between the real data area 161 and the metadata table 162 in the first memory block 16 and the mechanism of the key-value store according to the third modification.

In this modification, the entity of metadata is stored at a real data address of the real data area 161.

In the real data area 161 shown in FIG. 14, a file, a file name or file ID corresponding to the file, and the metadata address of a key are stored at each real data address.

In the metadata table 162, a key extracted from a file and a real data address which is a value corresponding to the key and at which the key exists are stored at each metadata address. Physical addresses corresponding to the metadata addresses are also shown.

When the metadata addresses are assigned to a physical address space different from that of the real data addresses, as described above, the correspondence table between the metadata addresses and the physical addresses is stored in the first memory block 16. The memory system (local system) or the host system reads out and uses the correspondence table.

A method of searching for a key in the metadata table and an example in which values are stored at continuous addresses will be described.

Figure 15:
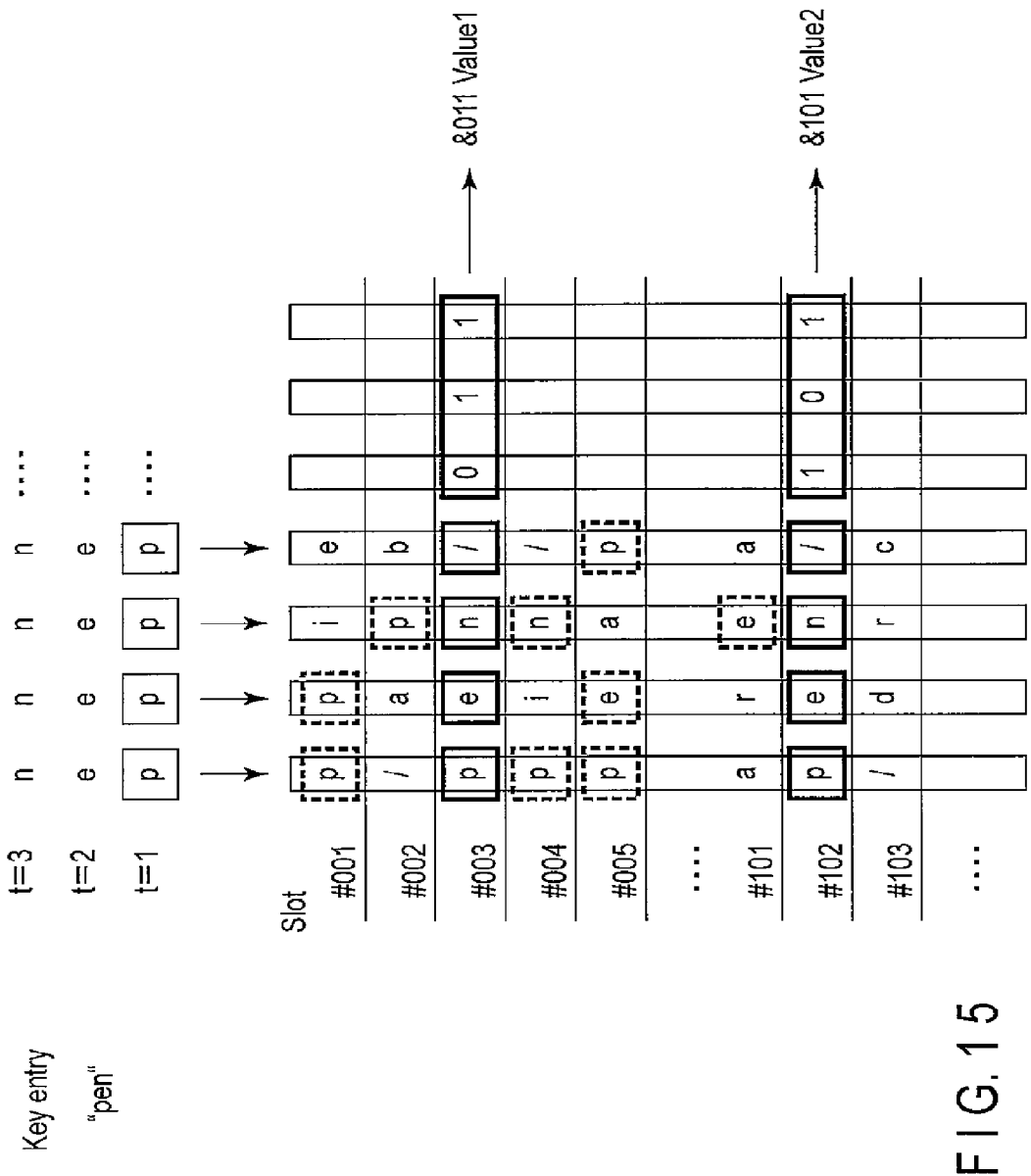
FIG. 15 is a view schematically showing another method of implementing the key-value store according to the third modification.

The key-value data in the metadata table 162 can also be implemented as shown in FIG. 15. The metadata address space is assumed to correspond to a specific physical address space of the first memory block 16. The search target area of continuous metadata addresses is divided into units called Slots. A key is stored in the start area of each Slot.

In the example shown in FIG. 15, a key "pen" is searched for. The memory controller 13 gives each character of the key to search the entire Slot. The key search mechanism of this example uses the hardware CAM of the memory controller 13 and the register memory 15 described in the embodiments.

A match flag is set for each Slot in which the first character "p" of "pen" is obtained. Next, "e" is searched for in these Slots. If a hit is obtained continuously, a flag is similarly set, and the next character is searched for. This operation is continued. In FIG. 15, the key matches in #003 and #102. When the read is continued in these Slots, values are obtained. The key and value can be discriminated because a control code is inserted between them.

This method can be extended to perform a search using a "don't care" mask bit.

[Fourth Modification]

In this modification, key-value data each storing a key having a fixed length and a full text search using them will be described as an example.

The need for fixed-length bits depends on the search method. The full text search methods are roughly classified into two types: (1) sequential search and (2) index search. The methods can further be classified by the indexing method. There are known (a) morphological analysis, (b) N-gram, and (c) suffix method.

Out of these methods, morphological analysis is a method of extracting a word existing in a dictionary prepared in advance. N-gram need not prepare any dictionary and can search for an arbitrary character string by dividing a word into N elements. For example, a search target set is defined as S. In uni-gram, the set S is divided on the character basis. In bi-gram, the set S is divided on the two-character basis. In N-gram, the set S is divided on the N-character basis. For example, when S=innovation is decomposed by bi-gram, the divided elements (tokens) are at, in, io, nn, no, n, on, ov, ti, and va. The suffix method handles an arbitrary length but is suitable for index file compression.

In the real data area 161 shown in FIG. 16, a file and a file name or file ID corresponding to the file are stored at each real data address. In the metadata table 162, a key extracted from a file by N-gram is stored at each metadata address.

In this example, each key of metadata is extracted by decomposing "innovation" stored at a real data address by bi-gram. A real address is shown as a value corresponding to each key. The appearance position in a file when a key is extracted from the file by bi-gram is stored in a pair. In the search by bi-gram, a key is searched for. After that, the results are sorted by the appearance count of the key. The pieces of position information in the files are compared to confirm that they represent a continuous keyword, thereby obtaining the set of the desired search word.

Since each key has a fixed length, key-value data can be formed directly using it as a hash value. In the example shown in FIG. 16, "at" and "in" are stored at metadata addresses in this order. Actually, each N-gram token may be represented by a bit string using, for example, an ASCII or UTF-6 code, and the bit string may be shortened and used as a metadata address.

As described above, the key-value store according to this embodiment is highly compatible with N-gram that handles a fixed length and is suitable for high-speed indexing. In a full text search, although the search speed is high, indexing takes time. In indexing, the metadata table including elements and sets is read out as needed. An element that needs to be added, updated, or deleted is searched for, and its set is edited. For this reason, file access frequently occurs. When the memory system of the embodiment is used, an efficient key-value store in the memory system can be implemented. This allows to perform indexing at a high speed without increasing the load on the host system.

In the embodiments, the usefulness of the key-value store in the memory system has been described many times by exemplifying a procedure of full text search. However, the technique of the embodiments is not necessarily specialized to perform the full text search.

The embodiments provide a key-value store mechanism and a detailed arrangement thereof to efficiently manage metadata when storing data in the memory system. That is, the embodiments provide a memory system capable of efficiently processing an operation request for metadata at a high speed using a key-value store.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system to store and read data using at least one pair of a key and a value corresponding to the key in a key-value store, comprising:
    a host device comprising a memory configured to store a table including the key and the value corresponding to the key;
    a memory device communicatively coupled to the host device via an interface, the memory device comprising a nonvolatile semiconductor memory to store data;
    a generator configured to generate an address; and
    a controller configured to communicate with the host device and the memory device and capable of executing data write/read request and a request based on the key-value store,
    wherein,
    the controller is configured to execute the data write/read request based on a first address designated in the data write/read request, and
    in response to the request based on the key-value store:
        the generator generates, in response to input of the key in the request based on the key-value store, a second address at which the value corresponding to the key is stored, the second address being stored in the key-value store, the controller outputs the second address to the memory in the host device, and the controller obtains the data by referring to a storage location of the nonvolatile semiconductor memory in the memory device designated by a third address, the third address being included in the value corresponding to the key stored at the second address.

2. The system of claim 1, wherein the generator is a fixed-length data generator.

3. The system of claim 1, wherein the host device includes the generator.

4. The system of claim 1, wherein the third address stored in the memory is capable of being sent to the memory device via the interface, wherein the host device is capable of reading data stored in the third address of the memory device.

5. The system of claim 1, wherein the generator is a hash generator.

6. The system of claim 5, wherein the value generated by the hash generator is a hash value.

7. The system of claim 6, wherein the hash value is subject to a modulo operation.

8. The system of claim 6, wherein the second address is capable of being computationally adjusted if the hash value collides with another hash value.

9. The system of claim 5, wherein the hash generator is capable of using a hash function algorithm.

10. The system of claim 1, wherein the interface is a PCIe interface.

11. The system of claim 1, wherein the table is stored in the memory device.

12. The system of claim 11, wherein the memory device comprises NAND flash memory.

13. The system of claim 1, wherein the system is capable of registering at least one pair of a key and a value corresponding to the key, wherein the registration includes a determination that the key was not previously registered.

14. A method for reading data using at least one of a pair of a key and a value corresponding to the key in a key-value store, the method comprising:

storing, at a memory associated with a host device, a table including the key and the value corresponding to the key, wherein the host device is communicatively coupled to a memory device via an interface;

acquiring a first logical address, which is generated by a generator using the key;

executing a data write/read request based on the first address designated in the data write/read request, by a controller;

in response to the request based on the key-value store:

generating, in response to input of the key in the request based on the key-value store, a second address at which the value corresponding to the key is stored, by the generator, the second address being stored in the key-value store, outputting the second address to the memory in the host device, by the controller and obtaining the data by referring to a storage location of the nonvolatile semiconductor memory in the memory device designated by a third address, by the controller, the third address being included in the value corresponding to the key stored at the second address.

15. The method of claim 14, wherein the generator is a hash generator.

16. The method of claim 15, wherein the value generated by the hash generator is a hash value.

17. The method of claim 16, wherein the hash value is subject to a modulo operation.

18. The method of claim 16, wherein the second address is computationally adjusted if the hash value collides with another hash value.

19. The method of claim 15, wherein the hash generator uses a hash function algorithm.

20. The method of claim 14, wherein the interface is a PCIe interface.

21. The method of claim 14, wherein the table is stored in the memory device.

22. The method of claim 14, wherein the memory device comprises NAND flash memory.

23. The method of claim 14, further comprising registering at least one pair of a key and a value corresponding to the key, wherein the registration includes a determination that the key was not previously registered.

* * * * *